United States Patent [19]

Ashcraft

[11] Patent Number: 4,797,746
[45] Date of Patent: Jan. 10, 1989

[54] DIGITAL IMAGE INTERFACE SYSTEM
[75] Inventor: William D. Ashcraft, Fullerton, Calif.
[73] Assignee: Rockwell International Coporation, El Segundo, Calif.
[21] Appl. No.: 88,369
[22] Filed: Aug. 24, 1987
[51] Int. Cl.⁴ .................... H04N 7/01; H04N 17/00
[52] U.S. Cl. ................................. 358/140; 358/141; 340/825.83
[58] Field of Search ............... 358/140, 141; 307/465; 364/706, 716; 340/825.83

[56] References Cited
U.S. PATENT DOCUMENTS

| | | | |
|---|---|---|---|
| 3,751,582 | 8/1973 | Wernikoff et al. | 358/257 |
| 4,057,836 | 11/1977 | Munsey | 358/140 |
| 4,148,070 | 4/1979 | Taylor | 358/141 |
| 4,386,367 | 5/1983 | Peterson et al. | 358/140 |
| 4,488,230 | 12/1984 | Harrison | 340/825.83 |
| 4,532,546 | 7/1985 | Aufiero et al. | 358/140 |
| 4,577,190 | 3/1986 | Law | 340/825.83 |
| 4,698,674 | 10/1987 | Bloom | 358/140 |

Primary Examiner—James J. Groody
Assistant Examiner—John K. Peng
Attorney, Agent, or Firm—H. Fredrick Hamann; David J. Arthur; James F. Kirk

[57] ABSTRACT

A digital image interface system converts digital image information from a first format to a second format. The interface system includes a data input line for receiving input data, which may include a plurality of frames and fields of digital image information in a first format. An image buffer memory comprising first and second buffers is connected to the input line for storing the input digital image information. Each buffer is sufficient for storing one of the fields or frames of digital image information. A data output line is connected to the buffers for outputting the digital image information from the memory. A controller includes programmable logic arrays programmed according to the first data format, the second data format, and a predetermined memory format. The controller is connected to the memory to provide control signals and address signals to cause successive fields or frames of the digital image information to be alternately written into the two buffers of the memory in the predetermined memory format, and to cause the contents of the buffer not being written to be read out in the second format onto the data output line.

6 Claims, 8 Drawing Sheets

SYSTEM DIAGRAM RELATIVE TO THE HBRI

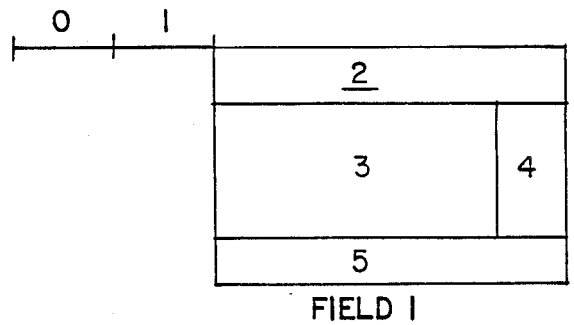
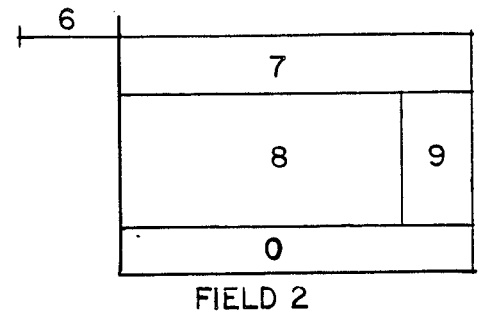
FIG. 4a    FIELD 1    INPUT HORIZONTAL SCAN FORMAT    FIELD 2    FIG. 4b
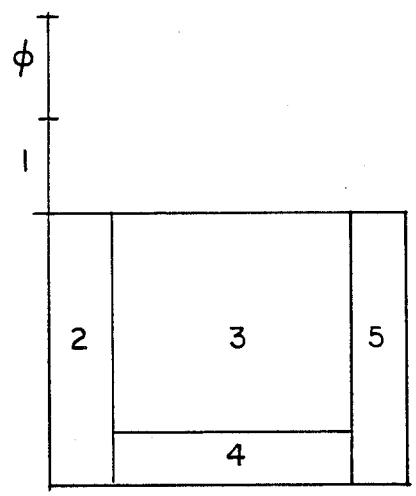
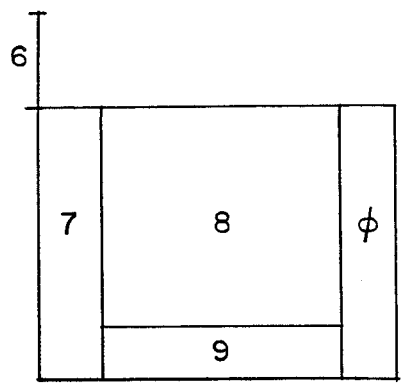
FIG. 5a    FIELD 1    INPUT VERTICAL SCAN FORMAT    FIELD 2    FIG. 5b
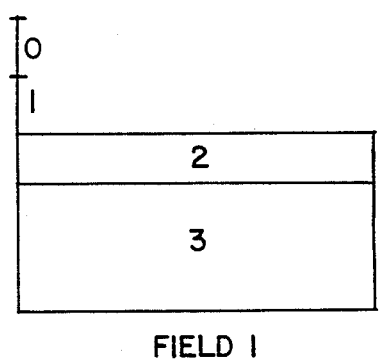
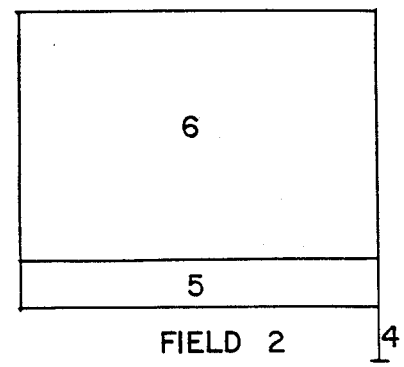
FIG. 6a    FIELD 1    FIELD 2    FIG. 6b
OUTPUT STANDARD DIGITAL SCAN CONVERTER FORMAT

OUTPUT CONTROLLER BLOCK SCHEMATIC

INPUT CONTROLLER BLOCK SCHEMATIC
(PART 1 of 5)

INPUT CONTROLLER BLOCK SCHEMATIC (PART 2 of 5)

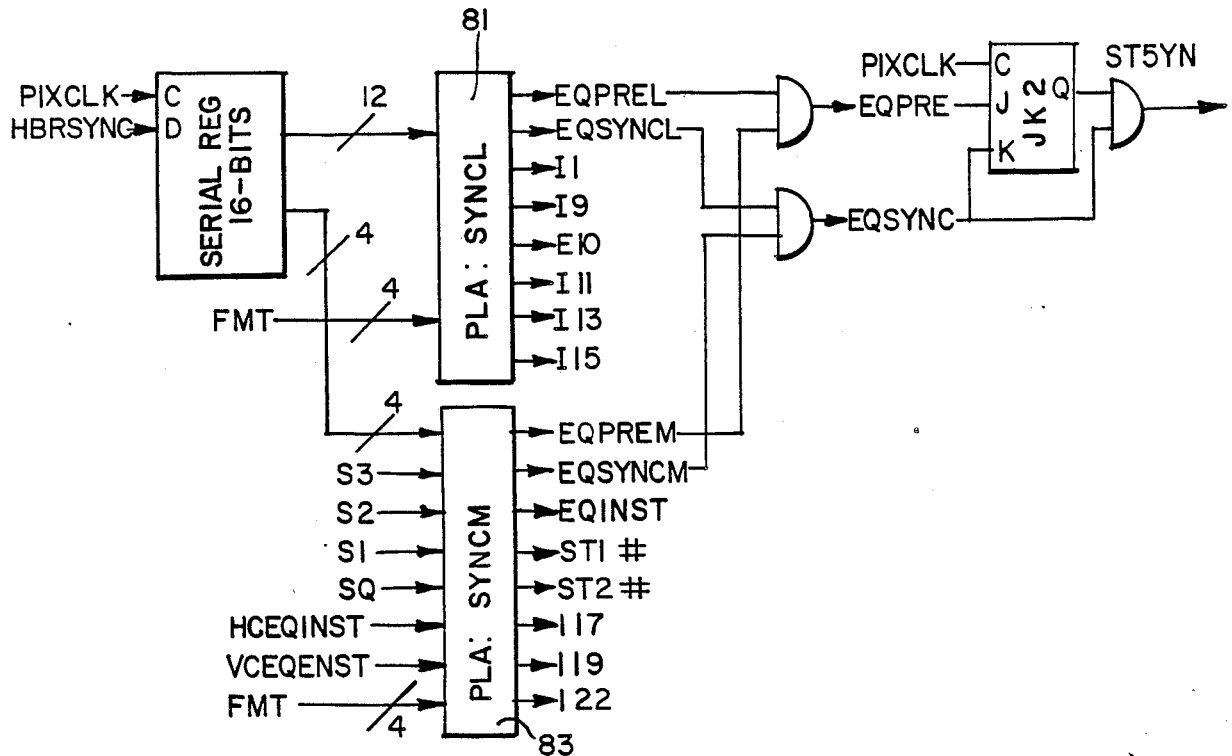
FIG. 8c   INPUT CONTROLLER BLOCK SCHEMATIC (PART 3 of 5)
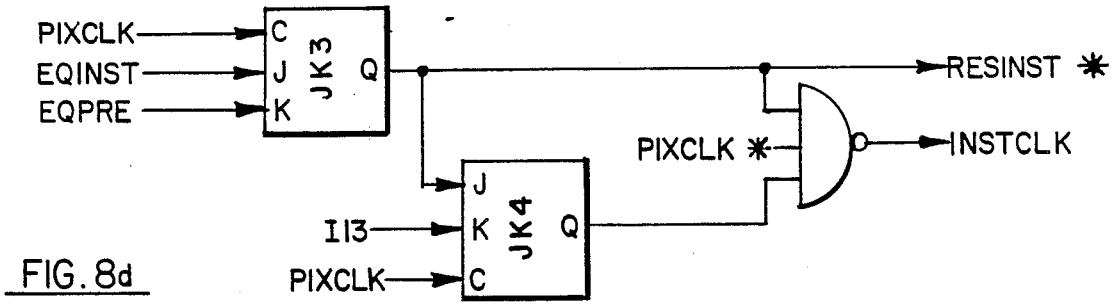
FIG. 8d   INPUT CONTROLLER BLOCK SCHEMATIC (PART 4 of 5)
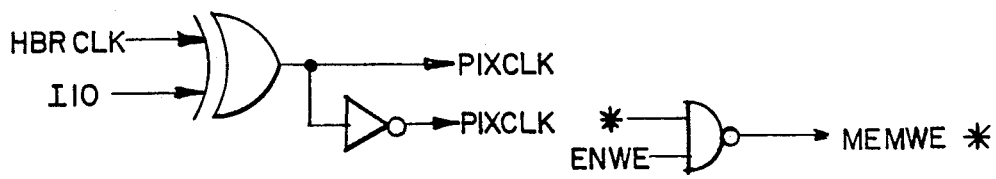
FIG. 8e   INPUT CONTROLLER BLOCK SCHEMATIC (PART 5 of 5)

IMAGE BUFFER MEMORY BLOCK DIAGRAM

DIGITAL IMAGE INTERFACE SYSTEM

The invention herein described was made in the course of or under a contract or subcontract thereunder, with the Department of the Air Force.

BACKGROUND OF THE INVENTION

The present invention relates to systems for converting digital image information that is in a special format, such as might be received from a high bit rate digital information storage medium, into a more conventional format, such as digital scan converter format or TV raster scan format.

Digital image information is frequently stored on a storage medium such as magnetic tape in specialized formats that may allow for compression of the data to use less of the storage medium. These storage devices may be referred to as high bit rate (HBR) recorders. Nevertheless, digital signal processors and visual displays media such as television (TV) typically require that the digital image information be in a standard format. Thus, conversion of the high bit rate digital image information to TV raster scan format must take place.

Apparatus for converting high bit rate digital image information into TV scan format or digital can converter format has often been constructed of special hardware for a particular format of the high bit rate digital information. Although this provides rapid operation, a new format converter must be constructed for each format of the high bit rate digital image information that is to be processed in the equipment.

SUMMARY OF THE INVENTION

The present invention is an interface system for converting digital image information from a storage format into another format, such as TV format or digital scan converter format. The system includes an input for receiving input digital image information and a memory connected to that input for storing the information. An input controller is connected to the memory and includes a programmable logic array programmed according to the format of the input digital image information, to cause the input digital image information to be read into a memory in a predetermined memory format. An output is connected to the memory for outputting the digital image information, and an output controller is also connected to the memory for controlling the output of the memory to cause the digital image information to be read out of the memory in the new output format.

Preferably the programmable logic array is programmed according to a plurality of formats of input digital information, and the system additionally includes means for selecting in the programmable logic array the format corresponding to the format of received input digital image information.

BRIEF DESCRIPTION OF THE DRAWINGS

FIGS. 4a and 4b show the scan areas in the two fields of input data to the HBR interface unit in horizontal scan format.

FIGS. 5a and 5b show the scan areas in the two fields of input data to the HBR interface unit in vertical scan format.

FIGS. 6a and 6b show the scan areas in the two fields of output data from the HBR interface unit.

FIGS. 8a–8e are block diagrams of different portions of the input controller of the HBR interface unit.

DETAILED DESCRIPTION OF THE PREFERRED EMBODIMENT

Figure 1:
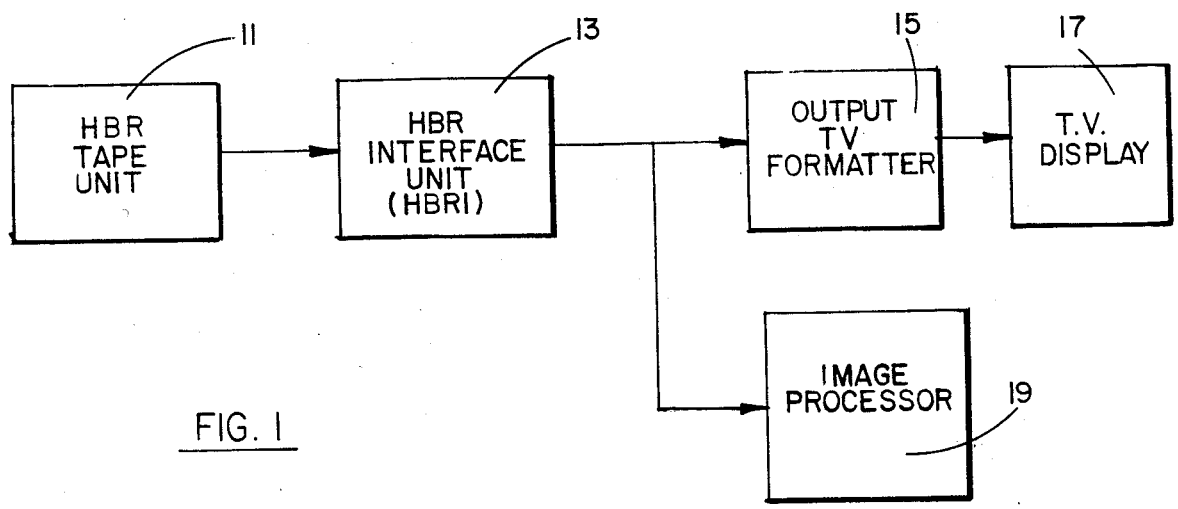
FIG. 1 is an overall block diagram of a system for displaying or processing information from a high bit rate storage unit.

An overall block diagram of a system for displaying or processing information from a high bit rate storage unit 11 is shown in FIG. 1. The high bit rate data storage unit is illustrated by an HBR tape unit. The storage unit 11 might also include an optical disk, or any other type of storage medium suitable for digital image information. The output of the storage unit 11 leads to the HBR interface unit (HBRI) 13.

The HBRI 13 converts the digital image information from the special format employed by the HBR tape unit 11 into a standard format, such as TV format or digital scan converter format for use by either a conventional television formatter 15 and television display 17, or an image processor 19. Although both the TV output and the image processor output are shown, either may be used independently. Also, the TV display and image processor are exemplary of the types of uses to which the data may be applied following standard formatting by the HBR interface unit. Because of its flexibility, the high bit rate interface unit of the invention may be used in any application in which digital image information must be converted from one format to a different format.

Figure 2:
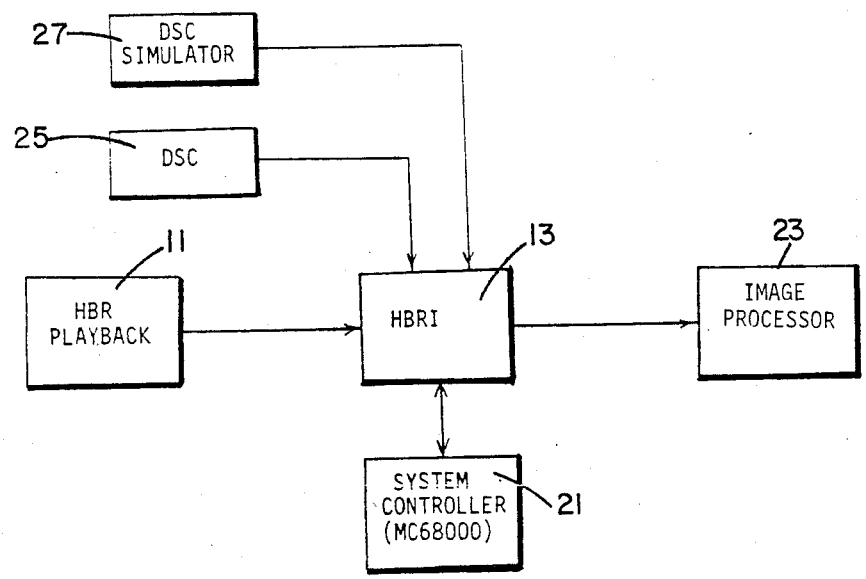
FIG. 2 is a block diagram of the portion of the system illustrated in FIG. 1 relating to the HBR interface (HBRI) unit.

FIG. 2 illustrates in block form the portion of the system relating to the HBR interface unit (HBRI).

The HBRI 13 receives digital image information directly from the high bit rate tape unit 11. Bidirectional control signals are passed back and forth between the HBRI and the system controller 21. The system controller is illustrated as a Motorola 68000 (MC68000) microprocessor. Those skilled in the art will recognize that other types of microprocessors may also be used for controlling the HBRI. The output of the HBRI is applied to whatever further signal processing or display apparatus exists. Also input to the HBRI is a digital scan converter signal from a DSC source 25, and a digital scan converter simulation signal from a DSC simulator 27. These inputs to the HBRI 13 are known in the industry for numerous types of conventional hardware interface units. The output of the HBRI is in converted format ready for further processing by image processing apparatus 23.

Figure 3:
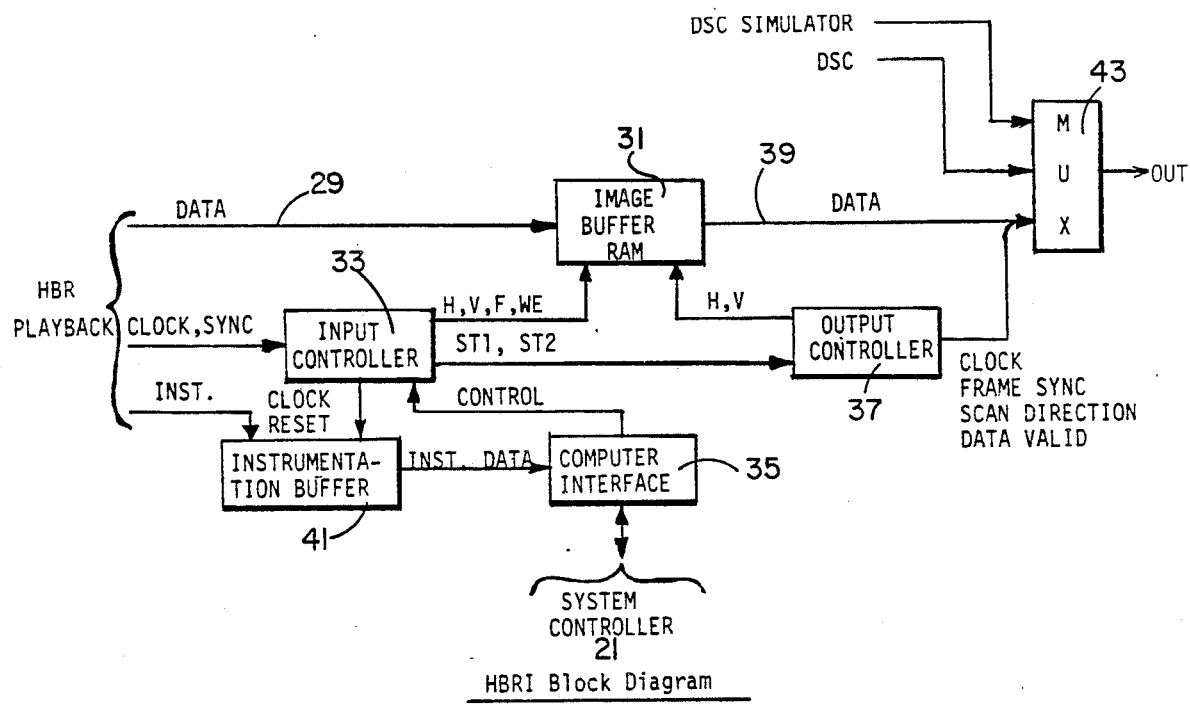
FIG. 3 is a block diagram of the HBR interface (HBRI) unit.

FIG. 3 is a more detailed block diagram of the HBRI unit 13 itself. The digital image information data enters the HBRI unit from the playback of the HBR tape unit on the input DATA line 29 in parallel with clock signals on the CLOCK line, and synchronization signals on the SYNC line, and instrumentation and control information on the INST. line. Ten differential line pairs carry the image data in parallel from the HBR tape playback. In addition, the CLOCK, SYNC, and INST. lines each consist of one differential line pair. Thus, thirteen differential line pairs connect the HBR playback unit and the HBRI.

The data enters an image buffer RAM 31 under the control of an input controller 33. The input controller controls the location in the image buffer RAM into which each data point or bit is read. The input controller is synchronized with the HBR tape unit playback through the clock signal received on the CLOCK line from the HBR tape unit. Control for the input controller is provided by the computer interface 35, which communicates with the system controller microprocessor 21 (FIG. 2). The control information received by the input controller 33 from the computer interface 35 identifies the HBR tape format (i.e. the format of the incoming digital image information from the HBR tape playback) in sufficient detail so the input controller can store the image data in a standard format in the image buffer RAM 31. The input controller 33 also provides synchronization to all parts of the HBRI.

The image buffer RAM 31 is a double buffer memory. Each memory preferably holds one frame of data, although each may hold just one field of data. While the input controller 33 is controlling the writing of data into one buffer memory portion, an output controller 37 may be reading from the other buffer portion. The input controller provides horizontal (H) and vertical (V) addresses for writing each bit of data, write enable pulses (WE) and the buffer select signal (F). If the input controller selects one buffer for writing, the other buffer is automatically connected to the output controller, which provides the horizontal (H) and vertical (V) addresses for reading out the data onto the output DATA line 39. When the input controller 33 changes its selection of buffers, the output controller 37 is signaled with the ST1 or ST2 signal that the other buffer is ready for reading.

The output controller 37 provides all the clocking and synchronization signals to the external signal or image processor, as well as the read addresses to the image buffer RAM. In the preferred embodiment illustrated the input controller passes control signals ST1 and ST2 to the output controller. These signals cause the output controller to select one or the other of the buffers in the image buffer RAM. The output controller is triggered by the input controller in such a way that frame synchronization occurs at the appropriate rate, which may be at 30 Hz, +/−0.1%, the same as provided by the HBR playback. The output frame synchronization is one frame time delayed (approximately 1/30 second) from the input frame synchronization, because the double buffering occurs on a frame basis. The output controller 37 may have its own independent clock, since only frame times are required to be synchronized between the input controller and the output controller.

An instrumentation buffer 41 stores instrumentation data. The input controller 33 supplies a clock signal to the instrumentation buffer. The clock signal and an address reset signal is a derivative of the clock from the HBR tape. The instrumentation buffer preferably provides storage for at least 1,024 16-bit words.

An output multiplexer 43 is controlled by control word signals from the system controller routed through the computer interface, the input controller, and the output controller. The output multiplexer 43 as controlled by the system controller 21 can select as the output from the system the data retrieved from the HBR tape and stored in the image buffer RAM 31, the digital scan converter simulator (DSC SIMULATOR), or the digital scan converter (DSC) inputs.

The output from the output multiplexer 43 is, in the preferred embodiment, suitable for transmitting digital data in standard digital scan converter (DSC) format. The multiplexer output may consist of 14 differential line pairs, including one for the pixel clock, one for the "data valid" signal, one for the frame synchronization, one for designating the scan direction, and ten data lines. The pixel clock of the HBR data input is preferably at a frequency no greater than 10 MHz. The pixel clock for the multiplexer output is preferably a frequency between 6 and 10 MHz. The frame synchronization signal initiates each frame transfer and preferably has a rate of 30 Hz. For conventional digital scan converter format, 426 lines of data are transferred in each scan direction. Thus, 136,320 clocks are required for each frame of data:

$$426 \text{ lines} \times 160 \text{ clocks} \times 2 \text{ directions} = 136{,}320.$$

The scan direction signal is preferably true for the first field of data and false for the second field of data.

The double buffer memory 31, as indicated above, preferably includes two memory devices, each of which may be $$512 \times 192 \times 10 = 983{,}040 \text{ bits in size.}$$

The memory can be addressed using nine bits for the horizontal address (for 512 maximum values) and eight bits for the vertical address (providing 192 maximum values). The memory should be able to input or output data linearly in either the horizontal or vertical direction at any rate up to approximately 10 MHz (100 nsec per pixel). A conventional static RAM may be used for this purpose.

Data may be loaded into the image buffer in the format required for output. Preferably the address (0,0) corresponds to the upper left pixel in each field of data.

There are preferably three clocks for the interface system. The pixel clock is derived from the HBR output pixel clock, and is used to clock all the circuits of the input controller 33 and to control the writing to the instrumentation buffer 41. A clock for the output controller 37 may be derived either from a crystal oscillator or from the HBR pixel clock. A clock from the system controller 21 may be used either to write the control words to the input section, or to read the contents of the instrumentation buffer.

The input controller and the output controller both comprise programmable logic arrays (PLAs), providing the advantage that several data input formats from the HBR tape unit may be processed by the HBRI without changing hardware. Different formats may be programmed into the programmable logic arrays, and then selected as needed. This eliminates the need to construct special hardware for each input data format to be processed. Additionally, new formats may be readily programmed into the interface unit. Thus, the interface of the HBRI is a programmable module designed to provide reformatting of the HBR digital video tapes of a variety of formats into the form required for conventional digital image processing.

INPUT SCAN AREAS

The present embodiment will be described with five formats used in the high bit rate storage device such as an HBR tape unit. These formats are listed in Table 1.

Each frame of video information may be divided into ten scan areas, as illustrated in FIGS. 4 and 5. Each of these areas is identified by dividing the scanned time into ten segments. From this information, the 426 by 320 pixel area containing the final image to be output from the system is selected and extracted from the input information. The areas 3 in each Field 1 (FIGS. 4a and 5a), and the areas 8 in the Field 2 shown in FIGS. 4b and 5b contain the actual image information, and are each normally 426 by 160 pixels. The Field 1 and Field 2 data of each format are interlaced to form the full 426 by 320 pixel image area.

Referring to FIGS. 4a and 5a, the area 0 is the waiting time between the Field 2 of one frame and the Field 1 of the next frame, and may be an area of undefined length. The area 0 is the waiting time for a presynchronization area code followed by a synchronization code on the synchronization track SYNC of the HBR tape output (FIG. 3). Together these two codes define a unique clock time in each complete frame of data. Area 0 ends at this unique clock time and causes the transition to the area 1. Area 0 may overlap areas 8 or 9, except for a minimum of one clock time, which is the stated unique clock time.

The area 0 ends with the transition to the area 1 when the signal STSYNC, which stands for START SYNCHRONIZATION, occurs at a defined bit pattern on the tape synchronization track SYNC. Area 1 in each of FIGS. 4a and 5a is a specific number of clocks that elapse from the synchronization code point to the first pixel in the Field 1. A minimum of two clocks is necessary for the area 1. The area 1 is generally set at less than one scan line, and ends at the left (horizontal scan format, FIG. 4a) or top (vertical scan format, FIG. 5a) edge of the image to be extracted.

The area 2 is the number of scan lines to be discarded before the first scan line in the image to be extracted.

The area 3 contains the image to be extracted. Area 3 is the valid video area of Field 1, and corresponds, for the horizontal scan format shown in FIG. 4a, to 426 pixels horizontally by 160 pixels vertically.

The area 4 is the area at the end of a scan line that is to be discarded, plus the retrace time, plus the area to be discarded before the start of the next line of the image to be extracted. The number of pixel clocks in one line of the area 3 plus the area 4 equals the number of pixel clocks in one full scan line, including both active and inactive pixels.

The area 5 contains the unused scan lines that are to be discarded at the end of the Frame.

Area 6 is the specific number of pixel clocks between Field 1 and Field 2. Generally, a minimum of two clocks are necessary for the area 6. These lines are to be discarded at the beginning of the Field 2.

Area 7 is the unused lines at the beginning of Field 2, if any, regardless of whether the second field (Field 2) is scanned in the forward direction or in the reverse direction.

Area 8 is the valid video area of Field 2, and, in the horizontal scan format shown in FIG. 4, corresponds to 426 pixels horizontally by 160 pixels vertically. The areas 8 and 9 in Field 2 correspond to the areas 3 and 4 in the Field 1, respectively.

Areas 8 and/or 9 end in the area 0 waiting for the next STSYNC (start synchronization) signal point on the tape synchronization track. Area 0 at the end of Field 2 is the wait state, waiting for the next synchronization code point.

Areas 2, 5, and 7 may separately be identified as having no data in them, thus being void. Areas 4 and 9 have the same number of pixels, and may be identified together as void. Therefore, the minimum number of pixel clocks per frame from the HBR tape unit is 426 times 160 for each of the areas 3 and 8 plus two clocks for each of the areas 1 and 6, plus one clock for each area 0. Thus a minimum of 136,325 clocks per frame is necessary. With a maximum clock rate of 10 megahertz, and 1/30 of a second per frame, the maximum number of pixel clocks per frame is 333,333.

The "I" Parameters

For defining the ten scan areas shown in FIGS. 4 and 5 for a particular scanned format, 25 "I" parameters are used. In the preferred form, they have the definitions listed in Table 2. For each format of input digital data, values for these parameters are determined to permit programming of the PLAs for a new format. For certain formats, some "I" parameters do not matter (become "don't care" values), and may be omitted. The listing of Table 2 also provides the form of the "I" parameter, its PLA location, its meaning, and under what conditions it is immaterial or unnecessary.

"I" parameter no. 1 (I1) defines whether the digital video HBR tape data is in horizontal scan format or vertical scan format.

"I" parameter no. 2 (I2) defines the total number of clocks per scan line, including both active and inactive pixels.

In the present embodiment, the third "1" parameter I3 is not used.

The parameter I4 defines the number of clocks in the scan area 6 (FIGS. 4a and 5a). This allows an arbitrary number of clocks to exist between the end of Field 1 and the beginning of Field 2.

The parameter I5 defines a unique bit pattern in the synchronization data that arms the HBR interface module for synchronization at the beginning of a frame of data. The parameter I6 defines a unique bit pattern in the synchronization data, following the pattern of the parameter I5, which defines a unique starting point before the first pixel of data in the frame of data to be extracted. I5 and I6 define a reference point (or a particular pixel clock) from which all other points (or pixels) in the frame are determined. The pre-arm code I5 is included to guard against the possibility that the synchronization code I6 may be repeated at other times in the frame. The first appearance of the sync code I6 following the appearance of the pre-arm code I5 is defined as the first field reference point, and should be unique for each frame.

The parameter I7 is the number of pixel clocks in the scan area 1 (FIGS. 4a and 5a). The parameter I8 is the number of scan lines in the scan area 2. Together the parameters I7 and I8 define the position of the upper left pixel of the data to begin storage of the one field of data into the image buffer memory. Because of the way in which some recording formats are set up, the sum of I7 and the number of pixels on a line (either 160 or 426) may exceed the value of parameter I2, creating the appearance that the active pixels in a line extend beyond the line end. Nevertheless, this is merely an artificial appearance.

The parameter I9 defines whether every pixel or every other pixel in a horizontal scan of the input data is to be taken for the output data. Assuming a two-to-one pixel decimation, and a horizontal format, every other pixel clock will be used. Or, if the recorded format is vertical, every other scan line will be used. Such decimation is what permits a greater storage density in the high bit rate storage unit.

Parameter I10 selects the input clock active edge or polarity. For all formats currently used, I10 is false. I11 defines whether Field 2 is to be scanned in the forward direction or in the reverse direction. The parameter I13 defines whether there are one or two pixel clocks per instrumentation data bit. Thus, I13 gives the factor by which the pixel clock must be divided to obtain the clock for the instrumentation data.

The parameter I15 defines whether the scan area 2 is void (has no data).

Parameter I16 specifies the value of the pixel counter at the end of the area 4. For horizontally scanned data, I16 is 424+N4, where N4 is the number of pixel clocks per line in scan areas 4 and 9. For vertically scanned data, I16 is 158+N4. The counter is VC for vertical format and HC for horizontal format.

Parameter I17 defines whether the scan area 5 is void, while Parameter I18 defines the number of scan lines in the area 5. Parameter I19 states whether the area 7 is void, while I20 defines the number of scan lines in area 7. Parameter I21 defines the value of the pixel counter (HC for horizontal format, VC for vertical format) at the end of the area 9.

The Parameters I22, I23, and I24 describe whether any of the area pairs 4 and 9, 1 and 2, or 5 and 7, respectively, are void. Generally, if one member of the pairs of areas 4 and 9, areas 1 and 2, and areas 5 and 7 is void, the other member of the respective pair is also made void. The parameter I22 is true if areas 4 and 9 both void. The parameter I23 is true if the areas 1 and 2 are both void. I24 is true if areas 5 and 7 are both void.

The parameter I25 equals the number of pixels in an output vertical scan line, minus one.

The time of the first bit of the instrumentation data is defined by the area in which it lies (S =area number), the HC horizontal pixel counter (HCQINST), and the VC vertical pixel counter value (VCEQINST). When the area number is S, and the horizontal pixel counter HC is HCEQINST, and the vertical pixel counter VC is VCEQINST, the position of the first bit in the instrumentation data is defined.

Table 2 also shows the locations of the I parameters, including the PLA name, the output pin number, and the output format. New I values may be incorporated into the PLAs along with a binary representation of the new format number, such as FMT1, FMT2, FMT3 and FMT4 (from least significant bit to most significant bit) by the use of the PLA programmer.

Programming the PLA's

The steps for programming a new format into the PLAs are described below.

1. First, the user determines descriptive data concerning the input HBR digital image data, including such information as:
   pixels per scan line (active and inactive);
   scan lines per frame (first and second fields, including active and inactive lines);
   scan format (horizontal or vertical);
   second field scan direction (forward or reverse), etc., as identified in table 2.

2. The characteristics of the SYNC data must be determined, These include a unique pattern for the pre-arm code and a unique pattern identifying the start of Field 1 after the pre-arm pattern.

3. Where the instrumentation data starts relative to the start point identified in step 2 must be determined. The point in step 2 should occur no later than the first bit in the instrumentation data.

4. Next, where the output 426×320 pixel array will be taken from the input pixel array in precise pixel counts must be determined, as must be whether a two-to-one decimation of the pixels is to be taken horizontally.

5. All the above data identified in steps 1 through 4 must be translated into precise I values as specified in table 2, or a similar arrangement of information.

6. A new format number (FMT number) is then chosen for the particular data format. Because of the nature of PLAs, the binary values must be entered into the PLA as two less than the determined values, except for the parameters I16, I21, and FMT, which may be entered unmodified.

7. During programming, the affected PLAs are removed from the HBR interface module, and the code is changed via a PLA programmer to incorporate the new code from the above step 6.

8. An HBR video tape of a prescribed predetermined format may be tested. If necessary, a logic analyzer may be used to verify the process and revise the PLA code as required to provide a satisfactory digital image extraction as displayed on the captured image display.

9. Finally, the instrumentation data is verified as captured by the image processor and/or a logic analyzer. If necessary, the PLA code may need to be revised to provide correct instrumentation data extraction.

OUTPUT SCAN AREAS

The data output from the double buffer memory 31 can be divided into six areas, as illustrated in FIG. 6. Standard digital scan converter (DSC) format is assumed in the described embodiment, in which Field 1 is forward-scanned top to bottom, left to right, and Field 2 is reverse-scanned, bottom to top, right to left. Other formats, such as conventional TV raster format, may also be used.

Output area 0 is the area of waiting for the first start code from the input controller 33, which preferably occurs at the beginning of the area 6 of input data shown in FIGS. 4b and 5b. Output area 2 (FIG. 6a) is an interline wait time of approximately 20 pixel clock times, which is used in conventional DSC format.

Output area 3 is the active output video area, and generally includes 160 pixels in the vertical direction and 426 pixels in the horizontal direction.

Area 4 is the interframe time, waiting for the second start code from the input controller that preferably occurs at the beginning of input area 1 of FIGS. 4a and 5a, to start the second field of output data.

Area 5 in the output format shown in FIG. 6b is the interline wait time, like output area 2.

Area 6 of the output format in FIG. 6b is the active output video area, like the output area 3 of FIG. 6a.

THE CONTROLLERS

The number of output pixels required for the standard digital scan converter format is 426×160×2, or 136,320 pixels per video frame. As discussed above, two controllers 33, 37 control the input and output of data from the image buffer RAM 31. The input controller 33 controls the reading of data from the HBR tape unit playback into the image buffer RAM, while the output controller 37 controls the output of data from the image buffer RAM. The input controller includes PLA devices programmable for multiple formats of input data. For example, the input controller PLAs may be programmable for up to sixteen different input data formats. The output controller may be fixed to provide digital scan converter (DSC) format output.

Nearly all the logic in both controllers is preferably coded in PLA devices using programming techniques rather than logic equation techniques. As the format conversion operation consists of a series of steps with logic at each step, programming techniques provide clear visibility of the logic of operation.

THE OUTPUT CONTROLLER

The output controller 37 will be discussed in detail first, as it is simpler than the input controller 33. Nevertheless, the principles of the output controller are also applicable to the input controller. A glossary of terms used in connection with the description of the output controller in provided in Table 3. A listing of a preferred output controller program is provided in Table 4.

For this output, the H value defines the horizontal pixel count and has a range of 0–425. The V value defines the vertical pixel count and has a range of 0–159. The F value defines which buffer of the image buffer RAM 31 is selected for data input, the alternate being selected for data output. The two field image buffers of the RAM 31 accept two sets of H and V values, but only one F value.

Thus, the address sequence for the output may be described as:

First field: (V:0-159)(H:0-425)(F:1)
Second field: (V:159-0)(H:425-0)(F:0)

A three bit OS register has contents that correspond to the areas of the output fields shown in FIG. 6. As there are seven areas, or states, the code in Table 4 is divided into seven areas.

A "wait" statement exists in each area. All statement lines prior to each wait statement in each area describe logic signals to be asserted during the entire time in which that state exists. The "wait for" statement identifies the time or condition that identifies the end of that state, and is true for only one clock period at a time. All indented statements following that wait statement are accomplished only during the one clock time that the preceding wait statement is true.

Referring now to the listing on Table 4, for OS=0 (output area 0), the DSCSYNC signal is asserted to be true in preparation for the output of Field 1 data. When the ST1 input signal becomes true, the "wait for ST1" statement becomes true for one clock time, allowing the next statement (which is indented) to be executed at the end of that clock period by the pixel clock. The operation is to reset both the HCO counter and the VCO counter, and to cause the state register (OS) to go to one (1).

When OS=1 (for output area 1), the DSCSYNC is continued to be asserted true, and the output signal FRMSYNC is generated for approximately two microseconds while the counter VCO counts to 20, which starts the output device receiving the output data. When the counter VCO reaches 20, OS is changed to 2 and the counter VCO is reset.

During the output of the data of output area 2, when OS=2, the DSCSYNC signal is continued to be asserted true, and the VCO counter is used only as a delay time counter, with no data input, as the VCO counter is always enabled. When the VCO counter reaches 20, which occurs after approximately two microseconds, the wait statement becomes true, allowing the next statement (which is indented) to be executed. The operation is to reset the VCO counter and go to state 3.

For state or output area 3 (OS=3), the DSCSYNC signal is continued to be asserted true, and the VALID signal is asserted true, because this is the period that one line of data at a time will be output from the memory device. When the VCO counter reaches 159, which corresponds to 160 pixels being output, the wait statement becomes true, allowing the next two statements 8 and 9 (both indented) to be executed. Only one of the two statements will actually be executed, however, because they both begin with "if" statements that are mutually exclusive. The convention here in Table 4 is that all conditions to the left of the colon (:) must be true for all the actions to the right of the colon (:) to be accomplished. If the HCO counter has not reached 425, there are more lines of data to be output, in which case line 8 is executed, causing the counter VCO to be reset, and the counter HCO to be increment by 1 by enabling the HCO counter for one clock time. Thus, a return is made to state OS=2 for another line of data output. If the HCO counter has reached 425, all of the Field 1 data has been output, in which case line 9 is executed, causing a shift to area 4 (OS=4), which is a wait state for data of Field 2.

In area 4, the DSCSYNC signal becomes false, in preparation for the Field 2 data output. When the ST2 signal from the input controller becomes true, the wait statement becomes true, allowing the next statement (line 11 of the program in Table 4) to be executed. The counter VCO is reset, and OS changes to 5, causing a transition to the area number 5 of the output format shown in FIG. 6b.

In area 5, a wait of approximately two microseconds per line is accomplished, as in area 2, by waiting for the counter VCO to count to 20. At the end of that wait time, the counter VCO is loaded with the number 159 in preparation for a countdown, since the data in Field 2 is reverse-scanned. The horizontal counter HCO has already in its initial condition of 425 from line 9 of the program. The program then shifts to area 6 (OS=6).

In area 6, the VALID signal is asserted to be true, because this is the period in which one line of data at a time will be output, and the DOWN signal is asserted, causing both the vertical and horizontal counters, VCO and HCO, to count downward. When the vertical counter VCO reaches 0 (corresponding to 160 pixels output), the wait statement becomes true, allowing the next two "if" statements to be executed, similar to that described for area 3. When the horizontal counter HCO reaches 0, the second field of data has been completely output, and the program returns to state 0 (OS=0) to wait for the next ST1 pulse.

In the program listing of Table 4, the lines that are numbered are the lines that produce one logic term in the PLA. The wait conditions stated to not produce a logic term, but identify a logic condition to be applied to the succeeding indented statements under each wait condition. The program therefore requires (theoretically) 14 logic terms. The actual number becomes different because two PLA devices are required, as described below.

Output Controller PLA Program Coding

The inputs and outputs used in the output controller are listed in Table 5. The outputs and inputs may also be listed as shown in Table 6. The outputs can be divided into two groups, as shown in Table 7. The top group, Output Group (1), pertains to those operations following the wait statements in the program listing of Table 4, while the bottom group, Output Group (2), pertains to those operations preceding the wait statements of the program listing in Table 4. The logic terms in the PLA program generating each group of outputs tend to be different from those generating the other group of outputs. Additionally, if there are too many logic terms for a single PLA, the division of outputs provides a convenient division of logic terms into two or more PLAs.

The PLA program coding may be generated by listing the inputs and outputs across the top of a listing, and then listing the code line numbers along the left, as shown in Table 6. For each code line number of the program listing in Table 4, the corresponding inputs may be entered into the table of Table 6. Finally, each code line number of the program listing in Table 4 may have the corresponding outputs input into Table 6. This results in the PLA program for the output controller. From there they may be readily converted into PLA code sheet entries in conventional format. As can be seen from Tables 6 and 7, program listing lines 2, 4, 6, 8A, 8B, 9, 10, 11, 13A, 13B, and 14 may be coded into PLA 1, while lines 1, 3, 5, 7, and 12 may be coded into PLA 2.

Code lines 8 and 13 are divided into two lines each (8A, 8B, 13A, 13B) in Table 6 in the illustrated embodiment. This division is made because the counter VCO is an 8-bit counter, providing convenient decoding by an 8-bit comparator (which may actually be one-half of a PLA) into the signals VCOEQO, VCOEQ20, and VCOEQ159. The counter HCO, on the other hand, is a 9-bit counter. For hardware convenience, HCO may be divided into eight less significant bits (LSBs) and one most significant bit (MSB). The eight LSBs are decoded by an 8-bit comparator (which may actually be the second half of the same PLA as used for decoding VCO) into HCOLEQO and HCOLEQ425. The output from this 8-bit comparator signal plus the one MSB (HC08) are fed to the program PLA for decoding to the full HCOEQO and HCOEQ425. These decodings are accomplished lines 8A, 8B and 9, and by the lines 13A, 13B, and 14 in Table 6.

The PLA program listed in Table 6 may be partitioned into two PLA devices by noting the two output groups in Table 7. For each output group, the corresponding inputs that affect one or more of the outputs in that group are marked with an "X" underneath those inputs in Table 6. The total inputs marked in each row (remembering that the signal OS counts as three inputs, as it contains three bits) are written in the Total Inputs column. For each output group, the total outputs from the top of Table 6 may be counted and written in the Total Outputs column. Then, for each output group, the number of lines that have an entry in that group may be counted for writing in the Number of Terms column.

Finally, the Total Inputs, the Total Outputs, and the Number of Terms are examined to see how many PLA devices may be required. In the illustrated example, Output Group (1) requires one PLA, having 11 inputs, 8 outputs, and 11 terms. Output Group (2) also requires one PLA, having 3 inputs, 4 outputs, and 5 terms. A commercially available PLA, such as model number 82S100, having 16 inputs, 8 outputs and 48 terms, may be used for each of these PLAs. Because the total number of outputs in both groups is 12, exceeding the limits of one PLA, the two PLAs are both required.

Figure 7:
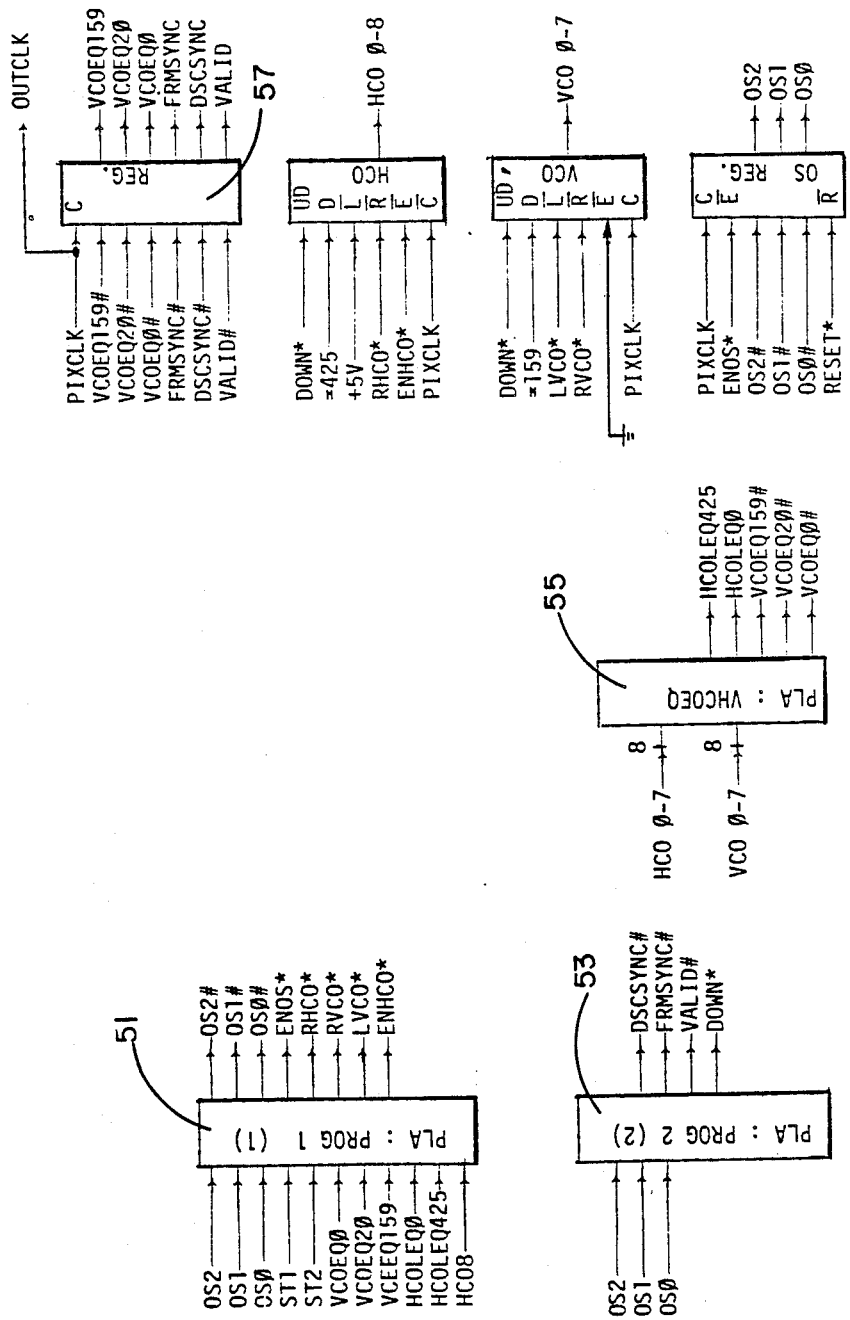
FIG. 7 is a block diagram of the output controller of the HBR interface unit.

The resulting output controller schematic is shown in FIG. 7. The two PLAs, including PLA: PROG1 51 for Output Group (1), and PLA:PROG2 53 for Output Group (2) are shown in the schematic of FIG. 7 with their corresponding inputs and outputs. For convenience, an asterisk (*) is appended to the outputs that go to a counter enabled by a logical low signal (such as reset, load, countdown and clock enable). A numeric symbol (#) is appended to all outputs that will be latched into a register. All OS outputs and, in general, all other logic signals are latched into a register.

A PLA VHCOEQ 55 decodes 8 bits from each of the counters VCO and HCO into logic signals VCOEQO, VCOEQ20, VCOEQ159, HCOLEQO, and HCOLEQ425. Because the delay through each PLA device is typically on the order of 50 nanoseconds (nsec), and the minimum clock period of the embodiment shown is 100 nsec, passing a logic signal through two PLA devices, plus the delay in setup time of the register, yields a maximum propagation time through the devices of greater than the required 100 nsec. Thus, the interface between the two PLAs 55, 51 is registered in the register 57 and delayed one clock cycle. This is shown for the three VCOEQ signals VCOEQO#, VCOEQ20#, and VCOEQ159#. Nevertheless, because the HCO clock counter is clocked at a much slower rate than the VCO counter, an adequate propagation time from clocking the HCO counter until its output value is tested is adequate, so that the HCOLEQ signals HCOLEQO and HCOLEQ425 do not need to be registered.

The coding for the PLA VHCOEQ 55 may be determined because when the counter HCO, is zero (0), the signal HCOLEQO is true, and when the counter HCO is 425, the signal HCOLEQ425 is true. When the counter VCO=158, the signal VCOEQ159# is true. The value 158 is used rather than 159 because the counter VCO is counting up and the VCOEQ numeric register introduces a one-clock period delay. When the counter VCO equals 159, the VCOEQ159 signal itself is true. When the VCO counter equals 19, the VCOEQ20# signal is true, and when the VCU counter equals 1, the VCOEQO# is true. In this instance, the counter VCO is counting down, so that when the VCO counter equals O, VCOEQO itself is true. Thus, a total of five terms are used in the PLA VHCOEQ 55.

The output controller 37 just described may be used to control the reading out of the contents of the buffer memory 31 onto the output line 39 in a predetermined format, such as conventional digital scan converter format as in the case of the preferred embodiment described, or TV raster scan format.

THE INPUT CONTROLLER

The input controller 33 of the HBRI must respond to the format of the incoming digital image information, and write the individual bits of that information into appropriate addresses in the buffer memory 31 to enable the output controller 37 to properly read the information out. The three primary conditions that determine the address sequence for writing data into the image buffer are whether the data is in horizontal or vertical format, whether the second Field is forward or reverse scanned, and whether the information contains a 2:1 pixel decimation. These three conditions may define eight address sequences as follows.

Horizontal format, 2nd Field forward, no pixel decimation:
 1st Field: (H:0---425) (V:0---159( F:0)
 2nd Field: (H:0---425) V:0---159) (F:1)
Horizontal Format, 2nd Field forward, 2:1 pixel decimation:
 1st field: (IL:0---1) (H:0---425) (V:0---159) (F:0)
 2nd field: (IL:0---1) (H:0---425) (V:0---159) (F:1)
IL is a flip-flop or a state bit used to enable or disable the write enable pulse and address clock to the image buffer. If IL=0, writing is enabled; if IL=1, writing is disabled.
Horizontal format, 2nd field reversed, no pixel decimation:
 1st field: (H:0---425) (V:0---159) (F:0)
 2nd field: (H:425---0) (V:159---0) (F:1)
Horizontal format, 2nd field reversed, 2:1 pixel decimation:
 1st field: (IL:0---1) (H:0---425) (V:0---159) (F:0)
 2nd field: (IL:1---0) (H:425---0) (V:159---0) (F:1)
Vertical format, 2nd field forward, no pixel decimation:
 1st field: (V:0---159) (H:0---415) (F:0)
 2nd field: (V:0---159) (H:0---425) (F:1)
Vertical format, 2nd field forward, 2:1 pixel decimation:
 1st field: (V:0---159) (IL:0---1) (H:0---425) (F:0)
 2nd field: (V:0---159) (IL:0---1) (H:0---425) (F:1)
Vertical format, 2nd field reverse, no pixel decimation:
 1st field: (V:0---159) (H:0---425) (F:0)
 2nd field: V:159---0) (H:425---0) (F:1)
Vertical format, 2nd field reversed, 2:1 pixel decimation:
 1st field: (V:0---159) (IL:0---1) (H:0---425) (F:0)
 2nd field: (V:159---0) (IL:1---0) (H:425---0) (F:1)

The H value defines the horizontal pixel count, and has a range of 0-425. The V value defines the vertical pixel count and has a range of 0-159. A glossary of terms used in connection with this description of the input controller is provided in Table 8.

A preferred program for the input controller is provided in Table 9. The basic program flow for the input controller program is much like that of the output controller program described above, but because of the many options permitted in the input data format, there are many "if" statements in the program listing of Table 9. The sequences of operations will become apparent to those skilled in the art and may be determined by studying the program listing of Table 9 together with the Glossary of Table 8.

Input Controller PLA Program Coding

As with the output controller, the inputs and outputs to the input controller program are identified, and are as listed in Table 10. There are seven inputs in the group HCEQ and five inputs to the group VCEQ, which are generated by two PLA devices that decode the combination of FMT and the HC and VC counters, respectively. The signal FMT is include to allow these limits to be a function of the high-bit rate tape format that is identified by a 4-bit code in FMT. Since only one input in each of these two groups, HCEQ and VCEQ, is used at any one time, two 8:1 multiplexers are used to select one each for direct input to the program PLA. These direct inputs are named HCEQ and VCEQ, respectively and the PLA outputs of HM(3 bits) and VM(3 bits) are added for control of these multiplexers, respectively. This multiplexer reduces the number of inputs to 15 lines, within the PLA limit of 16 inputs.

The outputs of the input controller may be divided into three groups. The first group pertains to those operations following the wait statements in the program listing of Table 9. The HM and VM controls may be put into this group because the multiplexer outputs that they control also pertain to the wait statements. The second group of outputs pertains to those operations preceding the wait statements in the program listing of Table 9. The terms ILJ and ILK may become the J and K inputs to a JK flip-flop to provide the four operations of 0-IL, 1-IL, TOGGLE-IL, and HOLD-IL. The third group, containing only ST1 and ST2, are supplied to the output controller, and may be created because these two outputs are simple decodings of the value of S. Because S also goes to another nonprogram PLA, ST1 and ST2 may be generated there, resulting in a reduction in the number of outputs from the more complex program PLAs.

The PLA program coding may be generated by the same process used for generating the PLA program coding of the output controller, but remembering the additional complexity because of the increased number of variables in the inputs and outputs. A listing of the inputs and outputs for each line of the program listing of Table 9 is shown in Table 11.

The true and false (T and F) states of the input parameters I1, I9, and I11 may be defined as follows:

| Condition | T/F |
|---|---|
| I1 = H | F |
| I1 = V | T |
| I9 = NDEC | F |
| I9 = DEC | T |
| I11 = FWD | F |
| I11 = REV | T |

The HM and VM values may be defined as follows:

| Test | HM = | Test | VM = |
|---|---|---|---|
| HC = 0 | 0 | VC = 0 | 0 |
| HC = 425 | 1 | VC = 159 | 1 |
| HC = I2 | 2 | VC = I8 | 2 |
| HC = I4 | 3 | VC = I16 | 3 |
| HC = I7 | 4 | VC = I18 | 4 |
| HC = I16 | 5 | VC = I20 | 5 |
| HC = I21 | 6 | VC = I21 | 6 |

Using the same principles as involved in the arrangement of the output controller, the outputs from the input controller may be divided into three groups. In addition, the outputs in Output Group (1) may be divided into three subgroups. The first subgroup may consist of the outputs ENS, 0-HC, 0-VC, 159-HC, and 425-VC. The second subgroup may consist of the outputs HM and VM, and the third subgroup may consist of the output S.

The outputs of subgroup (1) of Output Group (1) appear for one clock time only, because the inputs HCEQ and/or VCEQ themselves appear for one clock time only, as inputs to the wait statements.

The outputs of subgroup (2) of Output Group (1) appear for the entire period, and are not affected by HCEQ or VCEQ, as those outputs (HM and VM) determine tne HCEQ and VCEQ will be. The effect of HCEQ and VCEQ on HM and VM must be deleted in the PLA generating those outputs. The outputs of subgroup (2) may be generated in a separate PLA without the inputs HEQ or VEQ, or they may be generated in a PLA common to the outputs and processes of the first subgroup, with the effects of the HEQ and VEQ inputs deleted.

The S output in subgroup (3) of Output Group (1) may appear for the entire period, or it may be gated by the HCEQ and/or VCEQ inputs. This is possible because the register latching the S output is enabled by the ENS output, which is in the first subgroup. The S output may therefore be placed into either of the PLAs. The S output may be in the PLA generating the outputs of subgroup (1), or in the PLA generating the outputs of subgroup (2). Alternatively, the bits of the S output may be divided between the two PLAs.

The PLA Program listed in Table 9 may be partitioned into separate PLA devices. This is done as shown in Table 12 by the procedure described above in connection with the output controller program. As shown in Table 12, there are six output lines in subgroup (1), five output lines in subgroup (2), and four output lines inn subgroup (3), yielding a total of 15 output lines. Two PLA devices are indicated for the Output Group (1) outputs, and are designated 1A and 1B in Table 12. The Output Group 1A provides the HM and VM output, while the Output Group 1B provides the one clock time outputs, and the S output is divided between the two, with two bits of S in each Output Group 1A and 1B.

The Output Group 3 shown in Table 12 can be placed as the spare outputs of the groups 1A and 2. Nevertheless, a separate PLA is shown as preferred because the separate PLA may be used for other functions also, and it may be advantageous to leave spares available where feasible.

The PLA code sheets may be filled out directly as is known in the industry from the tables of Table 11 and Table 12, in a manner similar to that described above in connection witn the output controller.

Input Controller Schematic

Figure 8A:
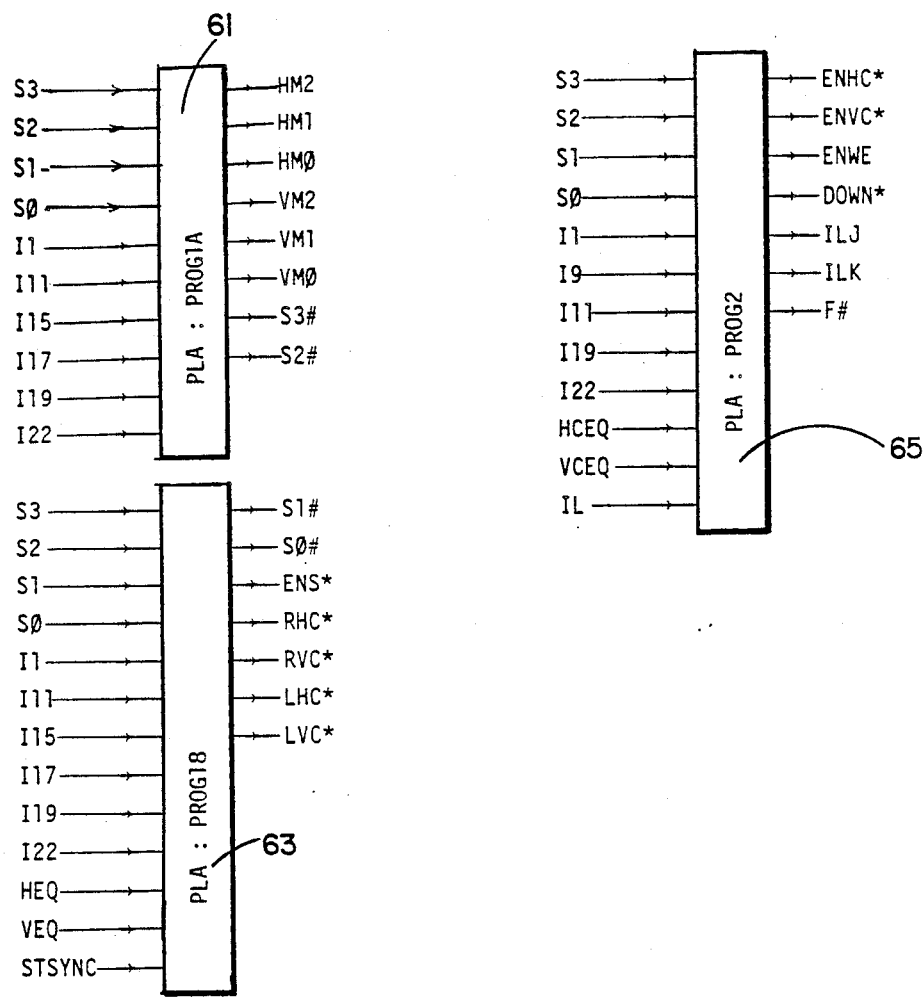
Figure 8B:
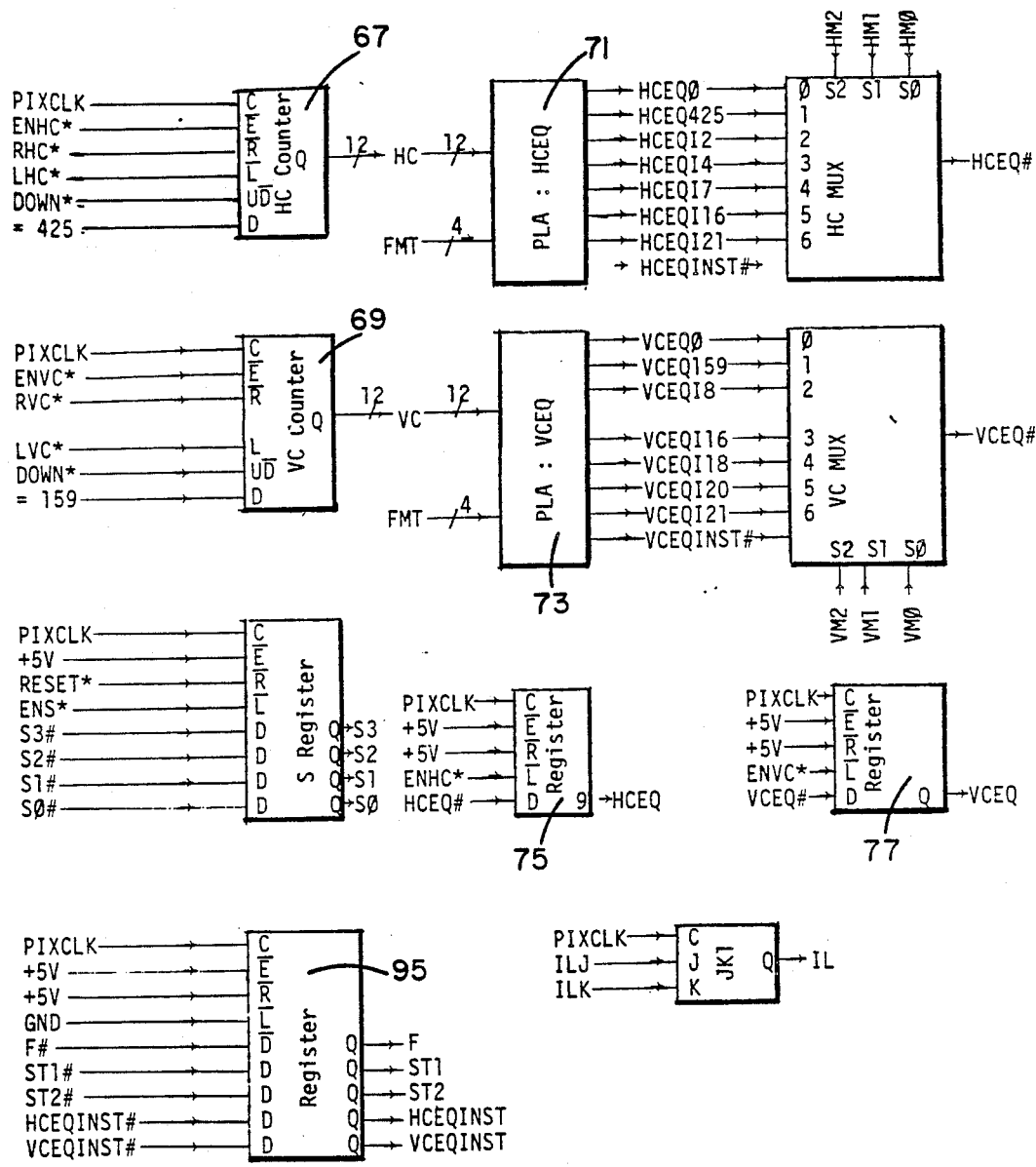

The input controller schematic may be generated using the contents of Tables 11 and 12 in a manner similar to that described above in connection with the output controller. The three program PLA devices are shown in FIG. 8a. The counters, registers, HCEQ and VCEQ multiplexer, and VCEQ and HCEQ PLA devices are illustrated in FIG. 8b. The remaining portions of the schematics, including FIGS. 8c through 8e is shown. These complete the connections to the remaining unconnected inputs and outputs of the devices shown in FIGS. 8a and 8b.

Referring first to FIG. 8a, the PLA:PROG1A 61 generates the terms of Output Group (1A), the PLA:-PROG1B 63 produces the terms of Output Group (1B), and the PLA:PROG2 65 generates the terms of Output Group 2. As is seen in FIG. 8a two bits of the output S (Group (3)) are generated by each of PLA:PROG1A 61 and PLA:PROG1B 63.

Referring next to FIG. 8b, the HC and VC counters 67, 69 are each preferably 12 bits. Although only 9 bits from the HC counter and 8 bits from the VC counter 69 go to the image buffer memory, 12 bits each are tested for the values in the two PLAs named HCEQ and VCEQ 71, 73, respectively. Each PLA 71, 73 has, in addition to tne counter 12 bit input, a 4 bit FMT input that identifies one of the 16 formats for the HBR tape. For a particular format, unique values for the parameters I2, I4, I7, etc. are determined. These values, in combination with the FMT code selected, provide the code for those two PLAs.

When actually coding tne PLA devices HCEQ and VCEQ 71, 73, generally the values programmed for HCEQ and VCEQ are not equal to the equality values for HCEQ and VCEQ determined above. A difference is necessary to account for the one count delay introduced by the HCEQ#and VCEQ# registers 75, 77. Additionally, the VC counter 69 and HC counter 67 both count beginning at zero, rather than at one. Thus, the actual PLA code values are as follows:

| HC = | PLA code | VC = | PLA code |
|------|----------|------|----------|
| 0    | 1        | 0    | 1        |
| 425  | 424      | 159  | 158      |
| I2   | I2-2     | I8   | I8-2     |
| I4   | I4-2     | I16  | I16      |
| I7   | I7-2     | I18  | I18-2    |
| I16  | I16      | I20  | I20-2    |
| I21  | I21      | I21  | I21      |

In FIG. 8c, the PLAs named SYNCL and SYNCM 81, 83 perform three functions. Those PLAs decode the signal FMT to provide the nine required "I" parameter values, each of which is a function of the HBR tape format. In addition, those PLAs decode the signal S to provide ST1 and ST2 to the output controller. Third, the PLAs decode 16 contiguous bits from the HBR synchronization track to determine the presence of the PRESYNC arm code and the SYNC code, both of which are functions of the signal FMT. The EQPREL (PLA:SYNCL 81) and EQPREM (SYNCM 83) signals are both true the instant that the 16 bit data in the serial register 85 matches the PRESYNC arm code. Those signals EQPREL and EQPREM are combined in an AND gate 87 to produce the EQPRE signal, as shown in FIG. 8C. Similarly, the EQSYNCL and EQSYNCM signals are combined in an AND gate 89 to produce the signal EQSYNC. The outputs of the AND gates 87, 89 EQPRE and EQSYNC are input to a JK flip-flop JK2 91 to produce the signal STSYNC, which occurs once at the beginning of each frame, and which initiates the program execution in the program PLAs PLA:-PROG1A 61, PLA:PROG1B 63, PLA:PROG2 65 shown in FIG. 8a.

The reset and clock signals to the instrumentation data circuits, named RESINST and INSTCLK, respectively, are generated in the portion of the circuit shown in FIG. 8d. The first bit of the instrumentation data begins at a unique value for each of HC, VC, and S. These HC and VC counter values are decoded in the PLA's HCEQ and VCEQ 71, 73 (FIG. 8b) as HCEQINST and VCEQINST. Nevertheless, the actual VC and HC values coded into the PLA's HCEQ and VCEQ 71, 73 are chosen to occur two clock times early because of delays in the HCEQINST# and VCEQINST# register 95 and in the JK flip-flop JK3 93. Those outputs are combined with the value of S through the PLA:SYNCM to produce the signal EQINST, which provides the start pulse for the instrumentation data circuits. That EQINST signal is processed through the third and fourth flip-flops 93 (JK3), 97 (JK4) to provide the RESINST and INSTCLK signals.

The clock from the high bit rate tape recorder playback, designated HBRCLK, is processed with the clock active edge parameter I10 as shown in FIG. 8E to produce the pixel clock PIXCLK and the memory write enable pulse MEMWE*.

Image Buffer Memory

Figure 9:
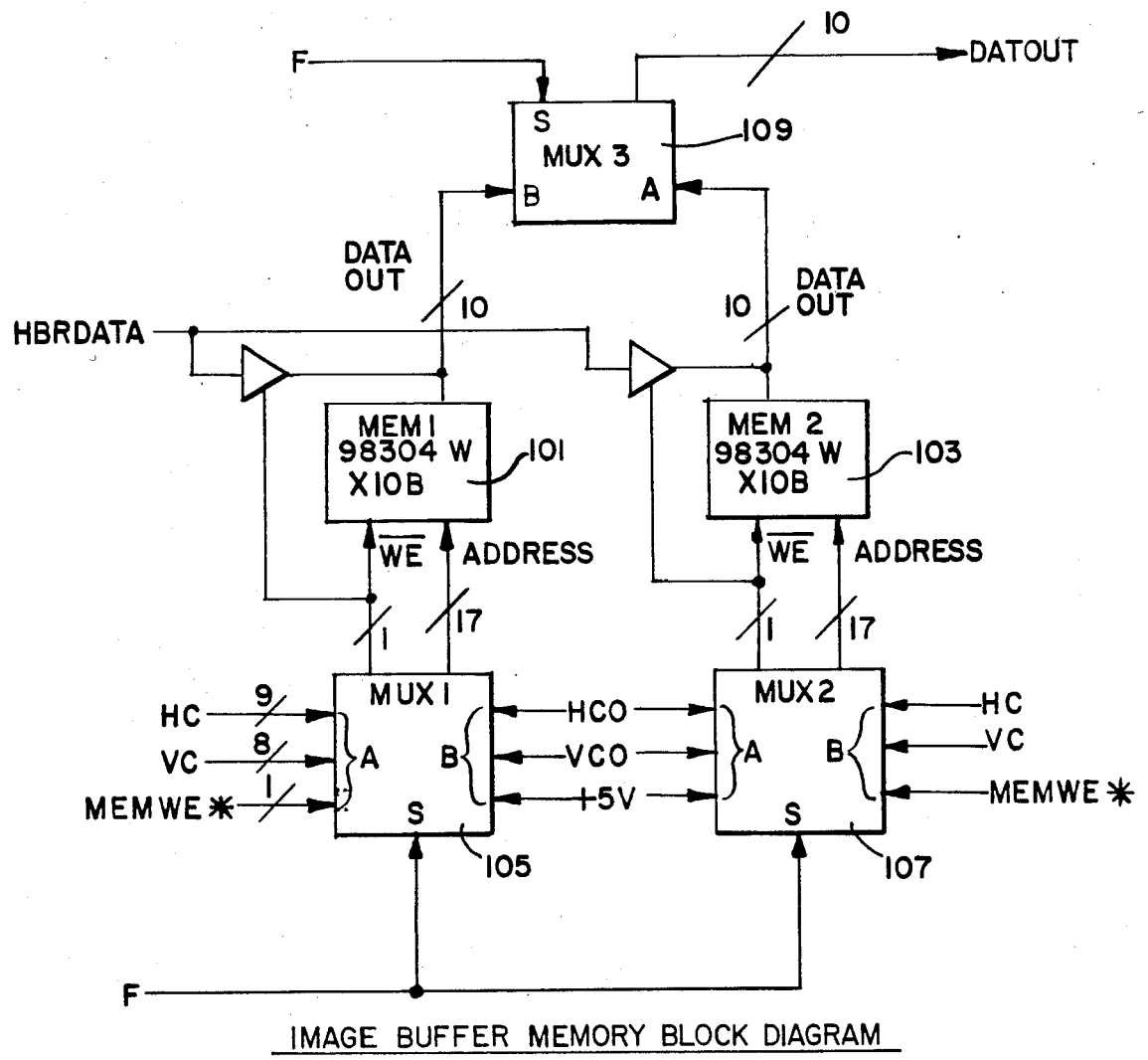
FIG. 9 is a block diagram of the image buffer memory of the HBR interface unit.

The image buffer memory is preferably a double buffer, with each buffer having a capacity of 98304 words by 10 bits each. A block diagram of the image buffer memory is shown in FIG. 9. Three multiplex switches 105, 107, 109 are controlled by the buffer select signal F from the register 95 of the input controller so that the buffers 101, 103 are alternately connected for input and output. The data from the high bit rate tape recorder playback, designates HBRDATA, is input to the memories 101, 103 via the line receivers, and the output data on the line DATOUT is provided to the further processors, either directly, or through a multiplexer as shown in FIG. 3.

The above description has provided many details concerning the preferred embodiment of the present invention to enable those of ordinary skill in the art to construct the invention. Nevertheless, it will be apparent to those skilled in the art, that many variations on the structure and in many of the specifics may be accomplished while still using the concepts of the invention. Thus, the scope of this patent is not limited to the preferred embodiment described above, but is limited only by the claims set forth below and the applicable laws relating to interpretation of those claims.

TABLE 1

| Format #: | Description: | Scan direction: | 2nd field: | inst. data? | H × V: | Image extraction: | tape clock: |
| --- | --- | --- | --- | --- | --- | --- | --- |
| 1 | Tower tapes | V | rev. | yes | 852 × 320 | discard every other V line; take remaining 426 × 320 image | 8.2 MHz |
| 2 | DTRI Hunter Leggett | V | rev. | yes | 957 × 240 | discard every other V line; take center 426 × 240 of remaining image | 7.4 MHz |
| 3 | Lantern tapes from TI | H | fwd. | yes | 576 × 525 | take center 426 × 320 image | 9.072 MHz |
| 4 | Hughes ATAS | H | fwd. | no | 632 × 512 | take center 426 × 320 image | 10.0 MHz |
| 5 | AFDCS | H | fwd. | no | 1024 × 326 | discard every other pixel along H line; take center 426 × 320 of remaining image | 10.0 MHz |

TABLE 2

| | | | | Definitions and descriptions of the "I" parameters | | |
| --- | --- | --- | --- | --- | --- | --- |
| I: | Form: | PLA location | Output pin: | Form: | Meaning: | don't care if: |
| 1 | T/F | SYNCL | 16 | logic level | T = ver. scan; F = hor. scan | — |
| 2 | value | HCEQ | 16 | pulse @ HC = I2 | total clocks per scan line | I15 = T, & I17 = T, & I19 = T |
| 3 | N/A | | | | | |
| 4 | value | HCEQ | 15 | pulse @ HC = I4 | no. of clocks in area 6 | — |
| 5 | bit pattern | SYNCM (4 bits) SYCNL (12 bits) | 18 18 | pulse @ match | pre-sync arm code | — |
| 6 | bit pattern | SYNCM (4 bits) SYCNL (12 bits) | 17 17 | pulse @ match | sync code (1st field start) | — |
| 7 | value | HCEQ | 13 | pulse @ HC = I7 | no. of clocks in area 1 | I23 = T |
| 8 | value | VCEQ | 16 | pulse @ VC = I8 | no. of clocks in area 2 | I15 = T |
| 9 | T/F | SYNCL | 15 | logic level | T = decimate 2:1 hor. | — |
| 10 | T/F | SYNCL | 13 | logic level | select clock active edge | — |
| 11 | T/F | SYNCL | 12 | logic level | T = 2nd field is reversed | |
| 12 | N/A | | | | | |
| 13 | T/F | SYNCL | 11 | logic level | T/F = 2/1 pixel clocks/inst. data bit | no inst. data |
| 14 | N/A | | | | | |

TABLE 2-continued

Definitions and descriptions of the "I" parameters

| I: | Form: | PLA location | Output pin: | Form: | Meaning: | don't care if: |
|---|---|---|---|---|---|---|
| 15 | T/f | SYNCL | 10 | logic level | T = area 2 is void | — |
| 16 | value | VCEQ | 15 | pulse @ VC = I16 | Pixel counter at end of area #4 | I22 = T |
|    | value | HCEQ | 12 | pulse @ HC = I16 | | |
| 17 | T/F | SYNCM | 12 | logic level | T = area 5 is void | — |
| 18 | value | VCEQ | 13 | pulse @ VC = I18 | no. of lines in area 5 | I17 = T |
| 19 | T/F | SYNCM | 11 | logic level | T = area 7 is void | — |
| 20 | value | VCEQ | 12 | pulse @ VC = I20 | No. of lines in area 7 | I19 = T |
| 21 | value | VCEQ | 11 | pulse @ VC = I21 | Pixel counter at end of area #9 | I22 = T |
| 22 | T/F | SYNCM | 10 | logic level | T = areas 4 & 9 are both void | — |
| 23 | T/F | PROG2 | 13 | logic level | T = areas 1 & 2 are both void | — |
| 24 | T/F | PROG2 | 12 | logic level | T = areas 5 & 7 are both void | — |
| 25 | value | LVC | all out | binary value | load VC value for reversed 2nd field scan | I1 = F, or I11 = F |
| VCEQINST | | VCEQ | 10 | binary values | defines inst. data start bit position | no inst. data |
| HCEQINST | | HCEQ | 10 | | | |
| SVAL | | SYNCM | 16 | | | |

TABLE 3

GLOSSARY FOR OUTPUT CONTROLLER

| TERM | DESCRIPTION |
|---|---|
| DOWN | Condition that the VCO and HCO counters will count down. |
| DSCSYNC | Logic signal to the ISA: true for frame #1; false for frame #2 |
| ENHCO | Enable to HCO counter |
| ENOS | Enable OS register to load new value |
| FRMSYNC | Frame sync signal to ISA which initiates frame data transfer |
| HCO | Output H counter |
| HCO8 | Bit 8 of HCO counter |
| HCOLEQ0 | Condition that the 8 LSBs of HCO correspond to 0 |
| HCOLEQ425 | Condition that the 8 LSBs of HCO correspond to 425 |
| LVC0 | Load signal which causes 159 → VCO |
| OS | 3 bit state (or area) pointer |
| OUTCLK | Output pixel clock to the ISA |
| PIXCLK | Pixel clock - main output controller clock |
| RHCO | Reset HCO which causes 0 → HCO |
| RVCO | Reset VCO which causes 0 → VCO |
| ST1 | Start #1 which initiates frame #1 output } from input controller |
| ST2 | Start #2 which initiates frame #2 output |
| VALID | Logic signal to ISA indicating valid data being transmitted |
| VCO | Output V counter |
| VCOEQ0 | Condition that VCO = 0 |
| VCOEQ20 | Condition that VCO = 20 |
| VCOEQ159 | Condition that VCO = 159 |
| ...* | * following a term indicates inversion (low = true) |
| ...# | # following a term indicates PLA output to D input of a register |

TABLE 4

Output Controller Program

| Code Line # | Area # OS = | Operation | Comments |
|---|---|---|---|
| 1 | 0 | 1 → DSCSYNC<br>wait for ST1 | wait for first field start pulse<br>↓ |
| 2 | | 1 → OS; 0 → HCO; 0 → VCO | go to area 1 |
| 3 | 1 | 1 → DSCYSNC; 1 → FRMSYNC<br>wait for VCO = 20 | generate FRMSYNC for approx.<br>2 microseconds |
| 4 | | 2 → OS; 0 → VCO | ↓ |
| 5 | 2 | 1 → DSCSYNC<br>wait for VCO = 20 | line wait approx. 2 microseconds<br>↓ |
| 6 | | 3 → OS; 0 → VCO | go to area 3 |

TABLE 4-continued

Output Controller Program

| Code Line # | Area # OS = | Operation | Comments |
|---|---|---|---|
| 7 | 3 | 1 → DSCSYNC; 1 → VALID<br>wait for VCO = 159 | output one line of data<br>↓ |
| 8 | | IF HCO ≠ 425:2 → OS; 0 → VCO; HCO + 1 → HCO | more data to output, return to area 1 |
| 9 | | IF HCO = 425:4 → OS | end of field #1; go to area 4 |
| 10 | 4 | wait for ST2<br>5 → OS; 0 → VCO | wait for field #2 start pulse<br>go to area 5 |
| 11 | 5 | wait for VCO = 20<br>6 → OS; 159 → VCO | line wait approx. 2 microseconds<br>go to area 6 |
| 12 | 6 | 1 → VALID; DOWN<br>wait for VCO = 0 | output one line of data<br>↓ |
| 13 | | IF HCO ≠ 0: 5 → OS; HCO − 1 → HCO; 0 → VCO | more data to output; return to area 5. |
| 14 | | IF HCO = 0: 0 → OS | end of field #2; go to area 0 |

TABLE 5

Output Controller Program Inputs and Outputs

| Inputs | Outputs |
|---|---|
| OS (3 bits) | OS (3 bits) |
| ST1 | ENOS |
| ST2 | 0 → HCO (RHCO) |
| VCO = 0 (VCOEQ0) | 0 → VCO (RVCO) |
| VCO = 20 (VCOEQ20) | 159 → VCO (LVCO) |
| VCO = 159 (VCOEQ159) | HCO ±1 → HCO (ENHCO) |
| HCO = 0 (HCOEQ0) | ODOWN |
| HCO = 425 (HCOEQ425) | DSCSYNC |
| | FRMSYNC |
| | VALID |

TABLE 6

PLA Program, Output Controller

| Code Line # | OS (3 bits) | ST1 | ST2 | VCO=0 | VCO=20 | VCO=159 | HCOL=0 | HCOL=425 | HCO8 |
|---|---|---|---|---|---|---|---|---|---|
| 1 | 0 | | | | | | | | |
| 2 | 0 | T | | | | | | | |
| 3 | 1 | | | | | | | | |
| 4 | 1 | | | | | | | | |
| 5 | 2 | | | | | | | | |
| 6 | 2 | | | | T | | | | |
| 7 | 3 | | | | | | | | |
| 8A | 3 | | | | | T | | F | |
| 8B | 3 | | | | | T | | T | 0 |
| 9 | 3 | | | | | T | | T | 1 |
| 10 | 4 | | T | | | | | | |
| 11 | 5 | | | | T | | | | |
| 12 | 6 | | | | | | | | |
| 13A | 6 | | | T | | | F | | |
| 13B | 6 | | | T | | | T | | 1 |
| 14 | 6 | | | T | | | T | | 0 |

| | Outputs | | | | | | | | |
|---|---|---|---|---|---|---|---|---|---|
| | (1) | | | | | (2) | | | |
| Code Line # | OS (3 bits) | ENOS | 0 → HCO | 0 → VCO | 159 → VCO | ENHCO | DSCSYNC | FRSYNC | VALID | DOWN |
| 1 | | | | | | | X | | | |
| 2 | 1 | X | X | X | | | | | | |
| 3 | | | | | | | X | X | | |
| 4 | 2 | X | | | | | | | | |
| 5 | | | | | | | X | | | |
| 6 | 3 | X | | X | | | | | | |
| 7 | | | | | | | X | | X | |
| 8A | 2 | X | | X | | X | | | | |
| 8B | 2 | X | | X | | X | | | | |
| 9 | 4 | X | | | | | | | | |
| 10 | 5 | X | | X | | | | | | |
| 11 | 6 | X | | | X | | | | | |
| 12 | | | | | | | | | X | X |
| 13A | 5 | X | | X | | X | | | | |
| 13B | 5 | X | | X | | X | | | | |
| 14 | 0 | X | | | | | | | | |

TABLE 7

PLA Code Division, Output Controller

| Output group | Inputs used | Total Inputs | Total Outputs | No. of Terms | No. of PLAs | Comments |
|---|---|---|---|---|---|---|
| (1) | X X X X X X X X | 11 | 8 | 11 | 1 | 1 - clock time |

TABLE 7-continued

| | | PLA Code Division, Output Controller | | | | |
|---|---|---|---|---|---|---|
| Output group | Inputs used | Total Inputs | Total Outputs | No. of Terms | No. of PLAs | Comments |
| (2) | X | 3 | 4 | 5 | 1 | enable logic |

TABLE 8

GLOSSARY FOR INPUT CONTROLLER

| Term | Description |
|---|---|
| DEC | Condition that horizontal data will be decimated 2:1 |
| DOWN | Condition that HC and VC counters will count down |
| ENHC | Enable HC counter to count |
| ENS | Enable S register to load |
| ENVC | Enable VC counter to count |
| ENWE | Enable write enable pulses to image buffer memory |
| EQPRE | Condition that 16 bits of syncdata match specified pre-arm-code |
| EQPREL | Condition that 12 LSBs of syncdata match specified pre-arm-code |
| EQPREM | Condition that 4 MSBs of sync data match specified pre-arm-code |
| EQINST | Condition that first bit of valid instrumentation data is present at HBR |
| EQSYNC | Condition that 16 bits of sync data match specified sync code |
| EQSYNCL | Condition that 12 LSBs of sync data match specified sync code |
| EQSYNCM | Condition that 4 MSBs of sync data match specified sync code |
| F | Memory double buffer select signal |
| FMT | 4 bit code identifying HBR tape format |
| FWD | Condition that frame #2 data is forward scanned |
| GND | Ground, providing a logical false signal |
| H | Condition that HBR tape data is horizontally formatted |
| HBR | High bit rate digital tape reproducer |
| HBRCLK | Pixel clock from the HBR tape unit |
| HBRSYNC | Serial data from the HBR sync track |
| HCEQ... | Condition that HC equals value "..." |
| HCEQINST | Condition that HC equals the value at which instrumentation data starts. |
| HCEQ | HC logic value test signal to PLA |
| HM (0-2) | HCEQ MUX selection code |
| I1 | Selects H or V input data format |
| I2 | No. of clocks per line, including any gaps in line data |
| I4 | No. of extra clocks between fields #1 and 2 |
| I7 | Pixel clock delay from sync code point to start of image data |
| I8 | No. of unused lines from sync code point to start of image data |
| I9 | Selects whether input data are 2:1 horizontally decimated |
| I10 | Selects which HBR clock polarity is selected for PIXCLK |
| I11 | Selects whether field #2 data is FWD or REV |
| I13 | No. of clocks per instrumentation data bit (1 or 2) |
| I(15-22) | See paragraph 2.3: "IX" refers to "Item #X" |
| IL | Logic signal used for 2:1 data decimation |
| IL(J-K) | Signals to a JK flip flop for generating IL |
| INSTCLK | Clock for storing instrumentation data |
| LHC | Load HC counter with 425 |
| LVC | Load VC counter with 159 |
| MEMWE | Write enable signal to image buffer memory |
| N4 | Number of pixel clocks per line in areas 4 and 9 of FIG. 1 |
| NDEC | Condition that input data will not be 2:1 decimated |
| PIXCLK | Pixel clock - main clock for input controller |
| RESET | A manual, power on, or computer-generated reset |
| RESINST | Signal used to reset instrumentation data circuits |
| REV | Condition that frame #2 data is reverse scanned |
| RHC | Reset HC counter to 0 |
| RVC | Reset VC counter to 0 |
| S | State register value (area # pointer) |
| ST1 | Start output frame #1 data |
| ST2 | Start output frame #2 data |
| STSYNC | Signal identifying one clock reference point per frame |
| V | Condition that HBR tape data is vertically formatted |
| VCEQINST | Condition that VC equals the value at which instrumentation data starts |
| VCEQ... | Condition that VC equals value "..." |
| VCEQ | VC logic test signal to PLA |
| VM (0-2) | VCEQ MUX selection code |
| +5 V | 5 volts, providing a logical true signal |

TABLE 9

Input Controller Program

| Code line # | Area # S = | Operation | Comments |
|---|---|---|---|
| | 0 | Wait for STSYNC | Wait for SYNC code point |

TABLE 9-continued
Input Controller Program

| Code line # | Area # S = | Operation | Comments |
|---|---|---|---|
| 1 | | $1 \to S; \emptyset \to HC$ | Go to area 1 |
| 2 | 1 | ENHC; ST2 | Wait for upper left corner of |
| | | wait for HC = 17 | rectangular area |
| 3 | | IF I15 = false: $2 \to S; \emptyset \to HC; \emptyset \to VC$ | Area 2 not void |
| 4 | | IF I15 = true: $3 \to S; \emptyset \to HC; \emptyset \to VC; \emptyset \to IL$ | Area 2 is void; go to area 3 |
| 5 | 2 | ENHC | Wait for end of line |
| | | wait for HC = I2 | ↓ |
| 6 | | IF VC ≠ I8: $2 \to S; \emptyset \to HC; VC + 1 \to VC$ | More area 2 |
| 7 | | IF VC = I8: $3 \to S; \emptyset \to HC; \emptyset \to VC; \emptyset \to IL$ | End of area 2; go to area 3 |
| 8 | 3 | IF I1 = H, I9 = NDEC: ENHC; ENWE | Valid image data area: enable |
| | | IF I1 = H, I9 = DEC | appropriate counter, and |
| 9 | | IF IL = ∅: ENHC; ENWE; $1 \to IL$ | decimate data if selected |
| 10 | | IF IL = 1: $\emptyset \to IL$ | ↓ |
| 11 | | IF I1 = V, I9 = NDEC: ENVC; ENWE | ↓ |
| | | IF I1 = V, I9 = DEC | ↓ |
| 12 | | IF IL = ∅: ENVC; ENWE | ↓ |
| 13 | | IF IL = 1: ENVC | ↓ |
| | | IF I1 = H: wait for HC = 425 | Wait for end of one line of image |
| 14 | | IF I22 = F: $4 \to S$ | data; then proceed to area |
| | | IF I22 = T | 3, 4, 5, or 6 depending on logic |
| 15 | | IF VC ≠ 159: $3 \to S; \emptyset \to HC; VC + 1 \to VC$ | conditions. If area 4 is void, |
| 16 | | IF VC = 159, I17 = false: $5 \to S; \emptyset \to HC; \emptyset \to VC$ | stay in area 3 until finished, |
| 17 | | IF VC = 159, I17 = true: $6 \to S; \emptyset \to HC$ | resetting pixel counters and |
| | | IF I1 = V: wait for VC = 159 | incrementing line counter (HC and |
| 18 | | IF I22 = false: $4 \to S$ | VC) at each line end. When |
| | | IF I22 = true | finished, go to area 6. |
| 19 | | IF HC ≠ 425: $3 \to S; \emptyset \to VC; HC + 1 \to HC$; toggle IL | ↓ |
| 20 | | IF HC = 425, I17 = false: $5 \to S; \emptyset \to HC; \emptyset \to VC$ | ↓ |
| 21 | | IF HC = 425, I17 = true: $6 \to S; \emptyset \to HC$ | ↓ |
| 22 | 4 | IF I1 = H: ENHC | Enable appropriate counter |
| 23 | | IF I1 = V: ENVC | ↓ |
| | | IF I1 = H: wait for HC = I16 | Wait for end of line (H) |
| 24 | | IF VC ≠ 159: $3 \to S; \emptyset \to HC; VC + 1 \to VC; \emptyset \to IL$ | More data coming; to area 3 |
| 25 | | IF VC = 159, I17 = false: $5 \to S; \emptyset \to HC; \emptyset \to VC$ | End of data; area 5 not void |
| 26 | | IF VC = 159, I17 = true: $6 \to S; \emptyset \to HC$ | End of data; ara 5 is void |
| | | IF I1 = V: wait for VC = I16 | Wait for end of line (V) |
| | | | ↓ |
| 27 | 4 | IF HC ≠ 425: $3 \to S; 0 \to VC; HC + 1 \to HC$; toggle IL | More data coming; go to area 3 |
| 28 | | IF HC = 425, I17 = false: $5 \to S; \emptyset \to HC; \emptyset \to VC$ | End of data.; area 5 not void |
| 29 | | IF HC = 425, I17 = true: $6 \to S; \emptyset \to HC$ | End of data; area 5 is void |
| 30 | 5 | ENHC | Use HC to count clocks, VC to |
| | | | count lines |
| | | Wait for HC = I2 | Wait for end of line |
| 31 | | IF VC ≠ I18: $5 \to S; \emptyset \to HC; VC + 1 \to VC$ | More area 5 |
| 32 | | IF VC = I18: $6 \to S; \emptyset \to HC$ | End area 5; go to area 6 |
| 33 | 6 | ENHC; $1 \to F$; ST1 | Use HC to count clocks |
| | | Wait for HC = I4 | Wait for end of area 6 |
| 34 | | IF I19 = false: $7 \to S; \emptyset \to HC; \emptyset \to VC$ | Area 7 not void; go to area 7 |
| | | IF I19 = true | Area 7 is void |
| 35 | | IF I11 = FWD: $8 \to S; \emptyset \to HC; \emptyset \to VC; \emptyset \to IL$ | Data forward |
| 36 | | IF I11 = REV: $8 \to S; 425 \to HC; 159 \to VC; 1 \to IL$ | Data reversed |
| 37 | 7 | ENHC; $1 \to F$ | Use HC to count clocks, VC to |
| | | | count lines |
| | | Wait for HC = I2 | Wait for end of line |
| 38 | | IF VC ≠ I20: $7 \to S; 0 \to HC; VC + 1 \to VC$ | More area 7; repeat |
| | | IF VC = I20 | End of area 7 |
| 39 | | IF I11 = FWD: $8 \to S; \emptyset \to HC; \emptyset \to VC; \emptyset \to IL$ | Data forward |
| 40 | | IF I11 = REV: $8 \to S; 425 \to HC; 159 \to VC; 1 \to IL$ | Data reversed |
| 41 | 8 | IF I1 = H, I9 = NDEC: ENHC; ENWE; $1 \to F$ | Valid image data area: enable |
| | | IF I1 = H, I9 = DEC | corresponding counter, and |
| 42 | | IF IL = ∅: ENHC; ENWE; $1 \to IL; 1 \to F$ | decimate data if selected |
| 43 | | IF IL = 1: $\emptyset \to IL; 1 \to F$ | ↓ |
| 44 | | IF I1 = V, I9 = NDEC: ENVC; ENWE; $1 \to F$ | ↓ |
| | | IF I1 = V, I9 = DEC | ↓ |
| 45 | | IF IL = ∅: ENVC; ENWE; $1 \to F$ | ↓ |
| 46 | | IF IL = 1: ENVC; $1 \to F$ | ↓ |
| 47 | | IF I11 = REV: DOWN | If data reversed, down-count |
| | | IF I1 = H, I11 = FWD: wait for HC = 425 | Wait for end of line; then test |
| 48 | | IF I22 = false: $9 \to S$ | for area 9 void: yes, stay in |
| | | IF I22 = true | area 8 until finished, resetting |
| 49 | | IF VC ≠ 159: $8 \to S; \emptyset \to HC; VC + 1 \to VC$ | pixel counter and incrementing or |
| 50 | | IF VC = 159: $\emptyset \to S$ | decrementing line counter at each |
| | | IF I1 = H, I11 = REV: wait for HC = ∅ | line end. When finished, go |
| 51 | | IF I22 = false: $9 \to S$ | to area ∅. |
| | | IF I22 = true | ↓ |
| 52 | | IF VC ≠ ∅: $8 \to S; 425 \to HC; VC - 1 \to VC$ | ↓ |
| 53 | | IF VC = ∅: $\emptyset \to S$ | ↓ |

TABLE 9-continued

Input Controller Program

| Code line # | Area # S = | Operation | Comments |
|---|---|---|---|
| | | IF I1 = V, I11 = FWD: wait for VC = 159 | |
| 54 | | IF I22 = false: 9 → S | |
| | | IF I22 = true | |
| 55 | | IF HC ≠ 425: 8 → S; ∅ → VC; HC + 1 → HC; toggle IL | |
| 56 | | IF HC = 425: 0 → S | |
| | | IF I1 = V, I11 = REV: wait for VC = ∅ | |
| 57 | | IF I22 = false: 9 → S | |
| | | IF I22 = true | |
| 58 | | IF HC ≠ ∅: 8 → S; 159 → VC; HC − 1 → HC; toggle IL | |
| 59 | | IF HC = ∅: ∅ → S | |
| 60 | 9 | IF I1 = H: ENHC; 1 → F | Enable appropriate counter |
| 61 | | IF I1 = V: ENVC; 1 → F | |
| 62 | | IF I11 = REV: DOWN | If data reversed, down-count |
| | | IF I1 = H: wait for HC = I21 | Wait for end of line (H) |
| | | IF I11 = FWD | Data forward |
| 63 | | IF VC ≠ 159: 8 → S; ∅ → HC; VC + 1 → VC; ∅ → IL | More data coming; go to area 8 |
| 64 | | IF VC = 159: ∅ → S | End of field #2; go to area ∅ |
| | | IF I11 = REV | Data reversed |
| 65 | | IF VC ≠ ∅: 8 → S; 425 → HC; VC − 1 → VC; 1 → IL | More data coming; go to area 8 |
| 66 | | IF VC = ∅: ∅ → S | End of field #2; go to area ∅ |
| | | IF I1 = V: wait for VC = I21 | Wait for end of line (V) |
| | | IF I11 = FWD | Data forward |
| 67 | | IF HC ≠ 425: 8 → S; ∅ → VC; HC + 1 → HC; toggle IL | More data coming; go to area 8 |
| 68 | | IF HC = 425: ∅ → S | End of field #2; go to area ∅ |
| | | IF I11 = REV | Data reversed |
| 69 | | IF HC ≠ ∅: 8 → S; 159 → VC; HC − 1 → HC; toggle IL | More data coming; go to area 8 |
| 70 | | IF HC = ∅: ∅ → S | End of field #2; go to area ∅ |

TABLE 10

Input Controller Program Inputs and Outputs

| Inputs | Outputs |
|---|---|
| S (4 bits) | S (4 bits) |
| I1 | ENS |
| I9 | 0 → HC (RHC) |
| I11 | 0 → VC (RVC) |
| I15 | 425 → HC (LHC) |
| I17 | 159 → VC (LVC) |
| I19 | HM (3 bits) |
| I22 | VM (3 bits) |
| HC=0 (HCEQ0) | ENHC |

TABLE 10-continued

Input Controller Program Inputs and Outputs

| Inputs | | Outputs |
|---|---|---|
| HCEQ | HC=425 (HCEQ425) | ENVC |
| | HC=I2 (HCEQI2) | ENWE |
| | HC=I4 (HCEQI4) | DOWN |
| | HC=I7 (HCEQI7) | ILJ |
| | HC=I16 (HCEQI16) | ILK |
| | HC=I21 (HCEQI21) | 1 → F |
| VCEQ | VC=0 (VCEQ0) | ST1 |
| | VC=159 (VCEQ159) | ST2 |
| | VC=I8 (VCEQI8) | |
| | VC=I20 (VCEQI20) | |
| | VC=I21 (VCEQI21) | |
| | IL | |
| | STSYNC | |

TABLE 11

PLA Program, Input Controller

| Code Line # | S (4 bits) | Inputs | | | | | | | | | | | | Outputs (1) | | | | | | | |
|---|---|---|---|---|---|---|---|---|---|---|---|---|---|---|---|---|---|---|---|---|---|
| | | I1 | I9 | I11 | I15 | I17 | I19 | I22 | HCEQ | VCEQ | IL | STSYNC | S (4 bits) | ENS | HM (3 bits) | VM (3 bits) | O→HC | O→VC | 425→HC | 159→VC |
| 1 | 0 | | | | | | | | | | | | 1 | X | | | X | | | |
| 2 | 1 | | | | | | | | | | | T | 2 | | | | | | | |
| 3 | 1 | | | | F | | | | T | | | | 3 | X | 4 | | X | X | | |
| 4 | 1 | | | | T | | | | T | | | | 3 | X | 4 | | X | X | | |
| 5 | 2 | | | | | | | | | | | | 2 | | | | X | | | |
| 6 | 2 | | | | | | | | T | F | | | 2 | X | 2 | 2 | X | X | | |
| 7 | 2 | | | | | | | | T | F | | | 3 | X | 2 | 2 | X | | | |
| 8 | 3 | F | F | | | | | | | | | | | | | | | | | |
| 9 | 3 | F | T | | | | | | | | | | | | | | | | | |
| 10 | 3 | T | F | | | | | | | | | | | | | | | | | |
| 11 | 3 | T | T | | | | | | | | | | | | | | | | | |
| 12 | 3 | T | T | | | | | | | | | | | | | | | | | |
| 13 | 3 | T | T | | | | | | | | | | | | | | | | | |
| 14 | 3 | F | F | | | | | | T | F | | | 4 | X | 1 | 1 | | | | |
| 15 | 3 | F | T | | | F | | F | T | T | | | 3 | X | 1 | 1 | X | | | |
| 16 | 3 | F | T | | | T | | T | T | T | | | 5 | X | 1 | 1 | X | X | | |
| 17 | 3 | T | F | | | | | T | T | T | | | 6 | X | 1 | 1 | | | | |
| 18 | 3 | T | T | | | | | F | T | T | | | 4 | X | 1 | 1 | | | | |
| 19 | 3 | T | T | | | F | | T | F | T | | | 3 | X | 1 | 1 | X | X | | |
| 20 | 3 | T | T | | | T | | T | T | T | | | 6 | X | 1 | 1 | X | X | | |
| 21 | 3 | | | | | | | | | | | | | | | | | | | |
| 22 | 4 | | | | | | | | | | | | | | | | | | | |
| 23 | 4 | | | | | F | | F | T | F | | | 3 | X | 5 | 1 | X | X | | |
| 24 | 4 | | | | | T | | T | T | F | | | 5 | X | 5 | 1 | X | X | | |
| 25 | 4 | | | | | | | | F | T | | | 6 | X | 5 | 1 | X | | | |
| 26 | 4 | | | | | F | | T | F | T | | | 5 | X | 1 | 1 | X | X | | |
| 27 | 4 | | | | | T | | T | T | T | | | 6 | X | 1 | 1 | X | X | | |
| 28 | 4 | | | | | | | | | | | | | | | | | | | |
| 29 | 4 | | | | | | | | T | F | | | 5 | X | 2 | 3 | X | | | |
| 30 | 5 | | | | | | | | T | T | | | 6 | X | 2 | 3 | X | X | | |
| 31 | 5 | | | | | | | | | | | | | | | | | | | |
| 32 | 5 | | | | | | | | | | | 7 | | | | 4 | X | | | |
| 33 | 6 | | | | | | | | | | | 8 | X | | | 4 | X | | | |
| 34 | 6 | | | | | F | | T | T | | | 8 | X | 3 | X | X | X | | | |
| 35 | 6 | | | | | T | | T | T | | | | X | 3 | X | | | X | | |
| 36 | 6 | | | | | | | | | | | | | | | | | | | |
| 37 | 7 | | | | | F | | T | T | | | 7 | X | 2 | X | X | | | | |
| 38 | 7 | | | | | T | | T | F | | | 8 | X | 2 | X | X | X | | | |
| 39 | 7 | | | | | | | T | T | | | 8 | X | 2 | X | | X | | | |
| 40 | 7 | | | | | | | | | | | | | | | | | | X | | |
| 41 | 8 | | | | | | | | | 0 | | | | | 5 | | X | X | | |
| 42 | 8 | | | | | | | | | 1 | | | | | 5 | | | | | |
| 43 | 8 | | | | | | | | | | 0 | | | | | | | | | |
| 44 | 8 | | | | | | | | | | 1 | | | | | | | | | |
| 45 | 8 | | | | | | | | | | | | | | | | | | | |
| 46 | 8 | | T | | | | | | | | | | | | | | | | | |
| 47 | 8 | T | F | | | | | | | | | 9 | X | | | | | | | |
| 48 | 8 | F | | | | | F | T | | | | | 1 | | | | | | | |

(1) X = don't care

TABLE 11-continued

PLA Program, Input Controller

| Line | | | | | | | | | | | | | | | |
|------|---|---|---|---|---|---|---|---|---|---|---|---|---|---|---|
| 49 | 8 | F | F |   |   | T | T |   |   |   | 8 | X | 1 | X |   |
| 50 | 8 | F | F |   |   | T | T |   | F |   | 0 | X | 1 |   |   |
| 51 | 8 | F | T |   |   | T | T |   | T |   | 8 | X | 0 |   |   |
| 52 | 8 | F | T |   |   | T | T |   | F |   | 0 | X | 0 |   |   |
| 53 | 8 | F | T |   |   | T | T |   | T | F | 8 | X | 0 |   |   |
| 54 | 8 | T | F |   |   | F | T |   | T | T | 0 | X | 0 |   |   |
| 55 | 8 | T | T |   |   | F | T |   | F | T | 8 | X | 1 |   | X |
| 56 | 8 | T | T |   |   | T | F | F | T | T | 0 | X | 1 |   |   |
| 57 | 8 | T | T |   |   | T | T | F | F | T | 9 | X | 1 |   |   |
| 58 | 8 | T | T |   |   | T | F | T | T | T | 0 | X | 0 |   |   |
| 59 | 9 | F |   |   |   | T | F |   |   |   | 8 | X | 0 |   |   |
| 60 | 9 | T |   |   |   |   |   |   |   |   | 0 | X | 0 |   |   |
| 61 | 9 |   |   |   |   |   |   |   |   |   |   |   |   |   |   |
| 62 | 9 | F | T | T |   |   |   | T | T | F | 6 | X | 6 |   |   |
| 63 | 9 | F | F | F |   |   |   | T | T | T | 6 | X | 6 |   |   |
| 64 | 9 | F | T | T |   |   |   | F | T | T | 6 | X | 6 |   |   |
| 65 | 9 | T | T | F |   |   |   | T | F | T | 6 | X | 1 |   |   |
| 66 | 9 | T | F | F |   |   |   | T | T | T | 1 | X | 1 |   |   |
| 67 | 9 | F | T | T |   |   |   | F | T | T | 0 | X | 0 |   |   |
| 68 | 9 | T | T | F |   |   |   | T | T | T | 0 | X | 6 |   |   |
| 69 | 9 | T | T | T |   |   |   | F | T | T | 6 | 0 | 6 |   |   |
| 70 | 9 | T | T | T |   |   |   | T | T | T | 0 | 0 | 6 |   |   |

| | | Code (2) | | | | Outputs (3) | | | |
|---|---|---|---|---|---|---|---|---|---|
| Line # | ENHC | ENVC | ENWE | DOWN | ILJ | ILK | 1 → F | ST1 | ST2 |
| 1 |   |   |   |   |   |   |   |   |   |
| 2 | X |   |   |   |   |   |   |   | X |
| 3 |   |   |   |   |   |   |   |   |   |
| 4 | X |   |   |   |   |   |   |   |   |
| 5 |   |   |   |   |   |   |   |   |   |
| 6 |   | X |   |   |   | X |   |   |   |
| 7 |   |   |   |   |   |   |   |   |   |
| 8 | X | X | X |   |   |   |   |   |   |
| 9 | X | X | X |   |   | X |   |   |   |
| 10 |   |   |   |   | X | X |   |   |   |
| 11 |   | X |   |   |   |   |   |   |   |
| 12 |   |   |   |   |   |   |   |   |   |
| 13 |   |   |   |   |   |   |   |   |   |
| 14 |   |   |   |   |   |   |   |   |   |
| 15 |   |   |   |   |   |   |   |   |   |
| 16 |   |   |   |   |   |   |   |   |   |
| 17 |   |   |   |   |   |   |   |   |   |
| 18 |   |   |   |   |   |   |   |   |   |
| 19 | X |   |   |   | X | X |   |   |   |
| 20 |   |   |   |   |   |   |   |   |   |
| 21 | X |   |   |   |   |   |   |   |   |
| 22 |   |   |   |   |   |   |   |   |   |
| 23 |   | X |   |   |   | X |   |   |   |
| 24 |   | X |   |   |   |   |   |   |   |
| 25 |   |   |   |   |   |   |   |   |   |

TABLE 11-continued

PLA Program, Input Controller

| Row | | | | | | | | | |
|---|---|---|---|---|---|---|---|---|---|
| 26 | | | | | | | | | |
| 27 | X | | | | | X | | | |
| 28 | | | | | | | | | |
| 29 | X | | | | | | | | |
| 30 | | | | | | | | | |
| 31 | X | | | | | | | | |
| 32 | | | X | | | | | | |
| 33 | | | | | | X | | X | X |
| 34 | | | | | | | | | |
| 35 | | | | | | X | | | |
| 36 | X | | | | | | | | |
| 37 | | | | | X | X | | X | |
| 38 | | | X | | | | | | |
| 39 | | | | | | | | | |
| 40 | | | | | X | | | | |
| 41 | X X | X X | | | | X | | X X X X X | |
| 42 | | | | X X | | | | | |
| 43 | | | | | | | | | |
| 44 | | X X | | | | | | | |
| 45 | | X | | | | | | | |
| 46 | | | | | | | | | |
| 47 | | | | | X | | | | |
| 48 | | | | | | | | | |
| 49 | | X | | | | | | | |
| 50 | | | | | | | | | |
| 51 | | X | | | | | | | |
| 52 | | | | | | | | | |
| 53 | | | | | | | | | |
| 54 | | | | | | | | | |
| 55 | X | | | | | X | | | |
| 56 | | | | | | | | | |
| 57 | | | | | | | | | |
| 58 | X | X | | | | X | | | X X |
| 59 | X | | | | | X | | | |
| 60 | | | | | | | | | |
| 61 | | | | | X | | | | |
| 62 | | X | | | | | | | |
| 63 | | X | | | | | | | X |
| 64 | | | | | | | | | |
| 65 | | | | | | X | | | |
| 66 | X | | | | | X | | | |
| 67 | X | X | | | | X | | X | |
| 68 | | | | | | | | | |
| 69 | | | | | | X | | X | |
| 70 | | | | | | | | | |

TABLE 12

| | PLA Code Division, Input Controller | | | | | |
|---|---|---|---|---|---|---|
| Output Group | Inputs used | Total Inputs | Total Outputs | No. of terms | No. of PLAs | Comments |
| 1A | X X  X X X X X | 10 | 8 | 47 | 1 | HM,VM,S (2 bits) |
| 1B | X X  X X X X X X X  X | 13 | 7 | 47 | 1 | 1-clock time |
| 2 | X X X X  X X X X X | 12 | 7 | 40 | 1 | Enable logic |
| 3 | X | 4 | 2 | 2 | 1 | ST1, ST2 |

What is claimed is:

1. An interface system for converting digital image information into an output format, the interface system comprising:
   an input for receiving input digital image information;
   a memory connected to said input for storing said digital image information;
   an input controller connected to said memory and comprising a programmable logic array programmed according to a plurality of formats, each, format corresponding to a format of a respective input digital image information signal, to cause said input digital image information to be read into said memory in a predetermined memory format;
   means for selecting a format in said programmable logic array a format corresponding to the format of the format of the received input digital image information signal;
   an output connected to said memory for outputting said digital image information;
   an output controller connected to said memory for controlling the output of said memory to cause said digital image information to be readout of said memory in said output format.

2. The interface system of claim 1 wherein said output controller comprises a second programmable logic array programmed according to said output format.

3. An interface system for converting digital image information into digital scan converter format, the interface system comprising:
   an input for receiving input digital image information in one of a plurality of predetermined input formats;
   a memory connected to said input for storing said digital image information;
   an input controller connected to said memory and comprising a programmable logic array programmed according to said plurality of predetermined input formats so that said input digital image information in one of said input formats is read into said memory in a predetermined memory format;
   an output connected to said memory for outputting said digital image information; and
   an output controller connected to said memory for controlling the output of said memory to cause said digital image information to be read out of said memory onto said output in a predetermined output format.

4. The interface system of claim 3 additionally comprising means for selecting in said programmable logic array the one of said plurality of input formats corresponding to the format of said input digital image information.

5. An interface system for converting digital image information from a first format into a second format, the interface system comprising:
   a data input line for receiving input data comprising a plurality of frames of digital image information in a first format;
   an image buffer memory comprising first and second buffers connected to said input line for storing said input data, wherein each of said buffers is sufficient for storing one of said frames of digital image information;
   an input controller connected to said image buffer memory and comprising a programmable logic array programmed according to said first format and to a predetermined memory format, for providing a buffer select signal to cause-successive fields of input digital image information to be alternately written into said first and second buffers, and addressing information to cause said input digital information to be read into said buffers in said predetermined memory format;
   a data output line connected to said buffers for outputting said digital image information from said memory; and
   an output controller connected to said buffers and comprising a programmable logic array programmed according to said memory format and to said second format for said digital image information, for providing to said memory addressing information to cause the contents of said buffers to be read out in said second format.

6. An interface system for converting digital image information from a first format into a second format, the interface system comprising:
   a data input line for receiving input data comprising a plurality of fields of digital image information in a first format;
   an image buffer memory comprising first and second buffers connected to said input line for storing said input digital image information, wherein each of said buffers is sufficient for storing one of said fields of digital image information;
   a data output line connected to said buffers for outputting said digital image information from said memory; and
   a controller comprising a programmable logic array programmed according to said first format, said second format, and a predetermined memory format, wherein said controller is connected to said memory to provide control signals and address signals to cause successive fields of said digital image information to be alternately written into said first and second buffers in said memory format, and to cause the contents of the buffer not being written to be read out in said second format onto said data output line.

* * * * *